(12) United States Patent
Guo et al.

(10) Patent No.: US 10,316,250 B2
(45) Date of Patent: Jun. 11, 2019

(54) METHOD TO IMPROVE THE MORPHOLOGY OF CORE/SHELL QUANTUM DOTS FOR HIGHLY LUMINESCENT NANOSTRUCTURES

(71) Applicant: NANOSYS, Inc., Milpitas, CA (US)

(72) Inventors: Wenzhou Guo, San Jose, CA (US); Christian Ippen, Sunnyvale, CA (US); Charles Hotz, San Rafael, CA (US); Rose Beeler, Suisan, CA (US); Jared Lynch, Berkeley, CA (US); Shihai Kan, San Jose, CA (US); Jonathan Truskier, Oakland, CA (US); Minghu Tu, Milpitas, CA (US)

(73) Assignee: Nanosys, Inc., Milpitas, CA (US)

( * ) Notice: Subject to any disclaimer, the term of this patent is extended or adjusted under 35 U.S.C. 154(b) by 11 days.

(21) Appl. No.: 15/599,848

(22) Filed: May 19, 2017

(65) Prior Publication Data

US 2017/0335187 A1    Nov. 23, 2017

Related U.S. Application Data

(60) Provisional application No. 62/338,864, filed on May 19, 2016.

(51) Int. Cl.
*C09K 11/88* (2006.01)
*B82Y 40/00* (2011.01)
(Continued)

(52) U.S. Cl.
CPC ............ *C09K 11/883* (2013.01); *C09K 11/02* (2013.01); *C09K 11/565* (2013.01); *C09K 11/70* (2013.01); *B82Y 20/00* (2013.01); *B82Y 40/00* (2013.01); *Y10S 977/774* (2013.01); *Y10S 977/818* (2013.01); *Y10S 977/824* (2013.01);
(Continued)

(58) Field of Classification Search
CPC .......................................... B82Y 10/00–40/00
See application file for complete search history.

(56) References Cited

U.S. PATENT DOCUMENTS

| | | |
|---|---|---|
| 5,505,928 A | 4/1996 | Alivisatos et al. |
| 6,207,229 B1 | 3/2001 | Bawendi et al. |

(Continued)

FOREIGN PATENT DOCUMENTS

| | | |
|---|---|---|
| WO | WO 2009/016354 A1 | 2/2009 |
| WO | WO 2013/058900 A1 | 4/2013 |

OTHER PUBLICATIONS

Farva, U. and Park, C., "Influence of thermal annealing on the structural and optical properties of CdSe nanoparticles," *Solar Energy Materials & Solar Cells* 94:303-309, Elsevier B.V., Netherlands (2010).

(Continued)

*Primary Examiner* — Alexandre F Ferre
(74) *Attorney, Agent, or Firm* — Sterne, Kessler, Goldstein & Fox P.L.L.C.

(57) ABSTRACT

Highly luminescent nanostructures, particularly highly luminescent quantum dots, comprising a nanocrystal core are provided. Also provided are methods of increasing the sphericity of nanostructures comprising subjecting nanocrystal cores to an acid etch step, an annealing step, or a combination of an acid etch step and an annealing step.

22 Claims, 4 Drawing Sheets

(51) Int. Cl.
  B82Y 20/00      (2011.01)
  C09K 11/02      (2006.01)
  C09K 11/56      (2006.01)
  C09K 11/70      (2006.01)
(52) U.S. Cl.
  CPC ........ *Y10S 977/892* (2013.01); *Y10S 977/896* (2013.01); *Y10S 977/95* (2013.01)

(56) References Cited

U.S. PATENT DOCUMENTS

| | | | |
|---|---|---|---|
| 6,225,198 B1 | 5/2001 | Alivisatos et al. | |
| 6,306,736 B1 | 10/2001 | Alivisatos et al. | |
| 6,322,901 B1 | 11/2001 | Bawendi et al. | |
| 6,501,091 B1 | 12/2002 | Bawendi et al. | |
| 6,576,291 B2 | 6/2003 | Bawendi et al. | |
| 6,607,829 B1 | 8/2003 | Bawendi et al. | |
| 6,788,453 B2 | 9/2004 | Banin et al. | |
| 6,803,719 B1 | 10/2004 | Miller et al. | |
| 6,821,337 B2 | 11/2004 | Bawendi et al. | |
| 6,861,155 B2 | 3/2005 | Bawendi et al. | |
| 7,060,243 B2 | 6/2006 | Bawendi et al. | |
| 7,068,898 B2 | 6/2006 | Buretea et al. | |
| 7,125,605 B2 | 10/2006 | Bawendi et al. | |
| 7,138,098 B2 | 11/2006 | Bawendi et al. | |
| 7,374,807 B2 | 5/2008 | Parce et al. | |
| 7,374,824 B2 | 5/2008 | Bawendi et al. | |
| 7,557,028 B1 | 7/2009 | Scher et al. | |
| 7,566,476 B2 | 7/2009 | Bawendi et al. | |
| 7,572,395 B2 | 8/2009 | Whiteford et al. | |
| 7,645,397 B2 | 1/2010 | Parce et al. | |
| 8,062,967 B1 | 11/2011 | Scher et al. | |
| 8,101,234 B2 | 1/2012 | Bawendi et al. | |
| 8,143,703 B2 | 3/2012 | Heald et al. | |
| 8,158,193 B2 | 4/2012 | Bawendi et al. | |
| 8,282,412 B1 | 10/2012 | Yaguchi et al. | |
| 8,425,803 B2 | 4/2013 | Parce et al. | |
| 8,563,133 B2 | 10/2013 | Whiteford et al. | |
| 8,916,064 B2 | 12/2014 | Liu et al. | |
| 9,005,480 B2 | 4/2015 | Furuta et al. | |
| 9,139,770 B2 | 9/2015 | Freeman et al. | |
| 9,169,435 B2 | 10/2015 | Guo et al. | |
| 2007/0034833 A1 | 2/2007 | Parce et al. | |
| 2008/0118755 A1 | 5/2008 | Whiteford et al. | |
| 2008/0237540 A1 | 10/2008 | Dubrow | |
| 2009/0045360 A1* | 2/2009 | Wosnick ................ | B41M 3/144 250/586 |
| 2010/0110728 A1 | 5/2010 | Dubrow et al. | |
| 2010/0155749 A1 | 6/2010 | Chen et al. | |
| 2010/0276638 A1 | 11/2010 | Liu et al. | |
| 2011/0262752 A1 | 10/2011 | Bawendi et al. | |
| 2011/0263062 A1 | 10/2011 | Bawendi et al. | |
| 2012/0113672 A1 | 5/2012 | Dubrow et al. | |
| 2013/0178047 A1* | 7/2013 | Harris ................ | C09K 11/7414 438/478 |
| 2014/0001405 A1* | 1/2014 | Guo .................... | H01L 33/0083 252/301.33 |
| 2015/0236195 A1 | 8/2015 | Guo et al. | |

OTHER PUBLICATIONS

International Search Report and Written Opinion for International Application No. PCT/US2017/033503, European Patent Office, Netherlands, dated Aug. 8, 2017, 14 pages.
Lim, K., et al., "Synthesis of blue emitting InP/ZnS quantum dots through control of competition between etching and growth," *Nanotechnology* 23:485609, IOP Publishing Ltd., England, 7 pages (2012).
Battaglia, D. and Peng, X., "Formation of High Quality InP and InAs Nanocrystals in a Noncoordinating Solvent," *Nano Letters* 2(9):1027-1030, American Chemical Society, United States (2002).
Blackburn, J.L., et al., "Electron and Hole Transfer from Indium Phosphide Quantum Dots," *J. Phys. Chem. B* 109:2625-2631, American Chemical Society, United States (2005).
Borchert, H., et al., "Investigation of ZnS Passivated InP Nanocrystals by XPS," *Nano Letters* 2(2):151-154, American Chemical Society, United States (2002).
Chen, L.-C. and Ho, C.-C., "Development of nanoparticle shape measurement and analysis for process characterization of $TiO_2$ nanoparticle synthesis," *Review on Advanced Material Science* 18:677-684, Advanced Study Center Co. Ltd., England (2008).
Chibli, H., et al., "Cytotoxicity of InP/ZnS quantum dots related to reactive oxygen species generation," *Nanoscale* 3:2552-2559, The Royal Society of Chemistry, United Kingdom (2011).
Cros-Gagneux, A., et al., "Surface Chemistry of InP Quantum Dots: A Comprehensive Study," *J. Am. Chem. Soc.* 132:18147-18157, American Chemical Society, United States (2010).
Guzelian, A.A., et al, "Colloidal chemical synthesis and characterization of InAs nanocrystal quantum dots," *Appl. Phys. Lett.* 69(10):1432-1434, American Institute of Physics, United States (1996).
Guzelian, A.A., et al, "Synthesis of Size-Selected, Surface-Passivated InP Nanocrystals," *J. Phys. Chem.* 100:7212-7219, American Chemical Society, United States (1996).
Haubold, S., et al., "Strongly Luminescent InP/ZnS Core-Shell Nanoparticles," *ChemPhysChem* 5:331-334, Wiley-VCH-Verlag GmbH, Germany (2001).
Hussain, S., et al, "One-Pot Fabrication of High-Quality InP/ZnS (Core/Shell) Quantum Dots and Their Application to Cellular Imaging," *ChemPhysChem* 10:1466-1470, Wiley-VCH Verlag GmbH, Germany (2009).
Kim, S., et al., "Highly Luminescent InP/GaP/ZnS Nanocrystals and Their Application to White Light-Emitting Diodes," *J. Am. Chem. Soc.* 134:3804-3809, American Chemical Society, United States (2012).
Li, L., et al. "Economic Synthesis of High Quality InP Nanocrystals Using Calcium Phosphide as the Phosphorus Precursor," *Chem. Mater.* 20:2621-2623, American Chemical Society, United States (2008).
Li, L. and Reiss, P., "One-pot Synthesis of Highly Luminescent InP/ZnS Nanocrystals without Precursor Injection," *J. Am. Chem. Soc.* 130:11588-11589, American Chemical Society, United States (2008).
Lim, J., et al., "InP@ZnSeS, Core@Composition Gradient Shell Quantum Dots with Enhanced Stability," *Chemistry of Materials* 23:4459-4463, American Chemical Society, United States (2011).
Liu, Z., et al., "Coreduction Colloidal Synthesis of III-V Nanocrystals: The Case of InP," *Angew. Chem. Int. Ed.* 47:3540-3542, Wiley-VCH Verlag GmbH & Co, Germany (2008).
Lucey, D.W., et al., "Monodispersed InP Quantum Dots Prepared by Colloidal Chemistry in a Noncoordinating Solvent," *Chem. Mater.* 17:3754-3762, American Chemical Society, United States (2005).
Mićić, O. I., et al., "Size-Dependent Spectroscopy of InP Quantum Dots," *J. Phys. Chem. B* 101:4904-4912, American Chemical Society, United States (1997).
Mićić, O. I., et al., "Core-Shell Quantum Dots of Lattice-Matched $ZnCdSe_2$ Shells on InP Cores: Experiment and Theory," *J. Phys. Chem. B* 104:12149-12156, American Chemical Society, United States (2000).
Mushonga, P., et al., "Indium Phosphide-Based Semiconductor Nanocrystals and Their Applications," *Journal of Nanomaterials* vol. 2012, Article ID 869284, 11 pages, Hindawi Publishing Corporation (2012).
Nann, T., et al., "Water Splitting by Visible Light: A Nanophotocathode for Hydrogen Production," *Angew. Chem. Int. Ed.* 49:1574-1577, Wiley-VCH Verlag GmbH & Co., Germany (2010).
Selmarten, D., et al., "Quenching of Semiconductor Quantum Dot Photoluminescence by a π-Conjugated Polymer," *Journal of Physical Chemistry B* 109:15927-15932, American Chemical Society, United States (2005).
Talapin, D.V., et al., "Etching of Colloidal InP Nanocrystals with Fluorides: Photochemical Nature of the Process Resulting in High Photoluminescence Efficiency," *Journal of Physical Chemistry B* 106:12659-12663, American Chemical Society, United States (2002).
Wang, A., et al., "Bright, efficient, and color-stable violet ZnSe-based quantum dot light-emitting diodes," *Nanoscale* 7:2951-2959, The Royal Society of Chemistry, United Kingdom (2015).

(56) References Cited

OTHER PUBLICATIONS

Wells, R.L., et al., "Use of Tris(trimethylsilyl)arsine to Prepare Gallium Arsenide and Indium Arsenide," *Chemistry of Materials* 1(1):4-6, American Chemical Society, United States (1989).

Xie, R., et al., "Colloidal InP Nanocrystals as Efficient Emitters Covering Blue to Near-Infrared," *J. Am. Chem. Soc.* 129:15432-15433, American Chemical Society, United States (2007).

Xu, S., et al., "Rapid Synthesis of High-Quality InP Nanocrystals," *J. Am. Chem. Soc.* 128:1054-1055, American Chemical Society, United States (2006).

Zan, F., et al., "Experimental Studies on Blinking Behavior of Single InP/ZnS Quantum Dots: Effects of Synthetic Conditions and UV Irradiation," *J. Phys. Chem. C* 116:3944-3950, American Chemical Society, United States (2012).

Ziegler, J., et al., "Silica-Coated InP/ZnS Nanocrystals as Converter Material in White LEDs," *Adv. Mater* 20:4068-4073, Wiley-VCH Verlag GmbH & Co., Germany (2008).

Reid, K., et al., "Chemical Structure, Ensemble and Single-Particle Spectroscopy of Thick-Shell InP—ZnSe Quantum Dots," *Nano Letters* 18:709-716 (2018).

\* cited by examiner

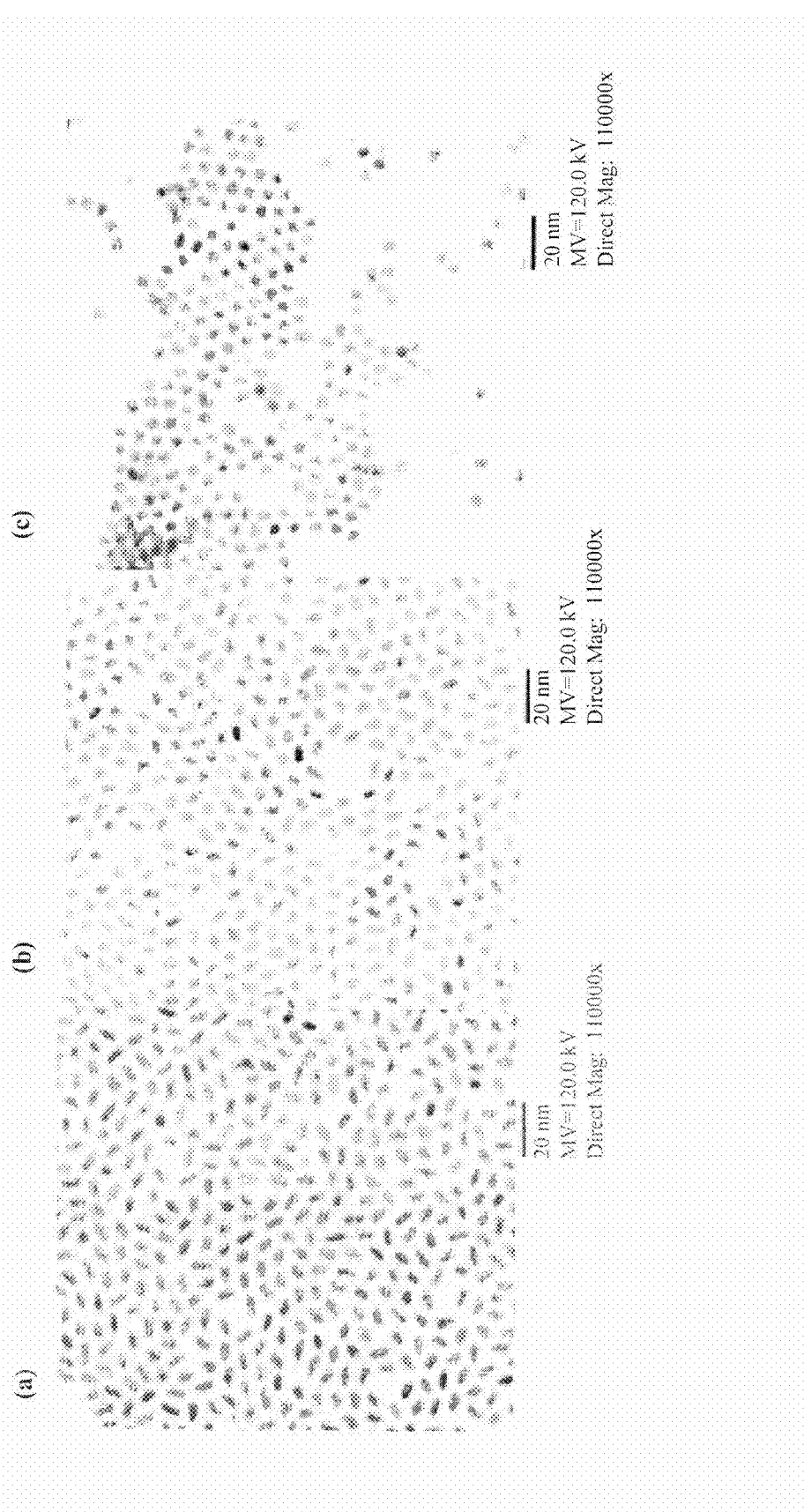

METHOD TO IMPROVE THE MORPHOLOGY OF CORE/SHELL QUANTUM DOTS FOR HIGHLY LUMINESCENT NANOSTRUCTURES

FIELD OF THE INVENTION

Highly luminescent nanostructures, particularly highly luminescent quantum dots, comprising a nanocrystal core are provided. Also provided are methods of increasing the sphericity of nanostructures comprising subjecting nanocrystal cores to an acid etch step, an annealing step, or a combination of an acid etch step and an annealing step.

BACKGROUND ART

Semiconductor nanostructures can be incorporated into a variety of electronic and optical devices. The electrical and optical properties of such nanostructures vary, depending on their composition, shape, and size. For example, size-tunable properties of semiconductor nanoparticles are, of great interest for applications such as light emitting diodes (LEDs), lasers, and biomedical labeling. Highly luminescent nanostructures are particularly desirable for such applications.

Quantum dots are nanometer-sized clusters that are generally comprised of a few hundred to several thousand atoms from Groups II-VI, III-V, and/or IV-IV. The physical dimensions of quantum dots are on the scale of the excitonic Bohr radius, a property that leads to a phenomenon called the quantum confinement effect. The quantum confinement effect leads to the ability to tune the optical and electronic properties of quantum dots—properties that are not observed in either bulk solids or the molecular level. Mushonga, P., et al., "Indium Phosphide-Based Semiconductor Nanocrystals and Their Applications," *J. Nanomaterials* 2012:Article ID 869284 (2012).

Inorganic shell coatings on quantum dots are a universal approach to tailoring their electronic structure. Additionally, deposition of an inorganic shell can produce more robust particles by passivation of surface defects. Ziegler, J., et al., "Silica coated InP/ZnS Nanocrystals as Converter Material in White LEDs," *Adv. Mater.* 20:4068-4073 (2008). For example, shells of wider band gap semiconductor materials such as ZnS can be deposited on a core with a narrower band gap—such as CdSe or InP—to afford structures in which excitons are confined within the core. This approach increases the probability of radiative recombination and makes it possible to synthesize very efficient quantum dots with quantum yields close to unity.

Core shell quantum dots that have a shell of a wider band gap semiconductor material deposited onto a core with a narrower band gap are still prone to degradation mechanisms—because a thin shell of less than a nanometer does not sufficiently suppress charge transfer to environmental agents. A thick shell coating of several nanometers would reduce the probability for tunneling, or exciton transfer and thus, it is believed that a thick shell coating would improve stability—a finding that has been demonstrated for the CdSe/CdS system.

Regardless of the composition of quantum dots, most quantum dots do not retain their originally high quantum yield after continuous exposure to excitation photons. Elaborate shelling engineering such, as the formation of multiple shells and thick shells—wherein the carrier wave functions in the core become distant from the surface of the quantum dot—have been effective in mitigating the photoinduced quantum dot deterioration.

To exploit the full potential of nanostructures in applications such as LEDs and displays, the nanostructures need to simultaneously meet five criteria: narrow and symmetric emission spectra, high photoluminescence (PL) quantum yields (QYs), high optical stability, eco-friendly materials, and low-cost methods for mass production. Most previous studies on highly emissive and color-tunable quantum dots have concentrated on materials containing cadmium, mercury, or lead. Wang, A., et al., "Bright, efficient, and color-stable violet ZnSe-based quantum dot light-emitting diodes," *Nanoscale* 7:2951-2959 (2015). But, there are increasing concerns that toxic materials such as cadmium, mercury, or lead would pose serious threats to human health al d the environment and the European Union's Restriction of Hazardous Substances rules ban any consumer electronics containing more than trace amounts of these materials. Therefore, there is a need to produce materials that are free of cadmium, mercury, and lead for the production of LEDs and displays.

Cadmium-free quantum dots based on indium phosphide are inherently less stable than the prototypic cadmium selenide quantum dots. The higher valence and conduction band energy levels make InP quantum dots more susceptible to photooxidation by electron transfer from an excited quantum dot to oxygen, as well as more susceptible to photoluminescence quenching by electron-donating agents such as amines or thiols which can refill the hole states of excited quantum dots and thus suppress radiative recombination of excitons. Coating the InP core with a ZnSe and/or a ZnS shell to form a core/shell structure—for example, InP/ZnSe/ZnS—is a general approach to increase and tailor the optical properties of InP nanoparticles and also make InP quantum dots more stable when used in display applications. See, e.g., Chibli, H., et al., "Cytotoxicity of InP/ZnS quantum dots related to reactive oxygen species generation," *Nanoscale* 3:2552-2559 (2011); Blackburn, J. L., et al., "Electron and Hole Transfer from Indium Phosphide Quantum Dots," *J. Phys. Chem. B* 109:2625-2631 (2005); and Selmarten, D., et al., "Quenching of Semiconductor Quantum Dot Photoluminescence by a π-Conjugated Polymer," *J. Phys. Chem. B* 109:15927-15933 (2005).

It is ubiquitously accepted that the formation of core/shell structures are necessary to utilize the luminescence properties of quantum dots. It is the state of art to grow a perfect shell material around the core. The obtained core/shell dots should be single crystal with spherical morphology. Such core/shell dots usually will provide high quantum yield (QY) and good stability under the harsh application conditions. There are three basic requirements necessary for the formation of an ideal core/shell structure: the core should have a narrow size distribution, a spherical morphology, and fewer interface defects. The ideal shelling material should have a wider band gap than that of the core material, and also should have a small crystal lattice mismatch with the core material.

As shown in FIG. 1, TEM images of quantum dots with an InP core and ZnSe and ZnS shells show quantum dots that have poor morphology: poor size distribution, sharp corners, and many crystal facets. This poor morphology indicates that the InP cores have not been uniformly covered by the shelling material. During the growth of a shell on a core nanoparticle, the crystal structure and morphology of the shell tends to originate with the structure and morphology of the core. Thus, the irregularity of the core may be carried to the resultant core/shell(s) nanoparticles.

Talapin, D. V., et al., "Etching of Collodial InP Nanocrystals with Fluorides: Photochemical Nature of the Process Resulting in High Photoluminescence Efficiency," *J. Phys. Chem. B* 106:12659-12663 (2002) disclosed improving the photoluminescence efficiency of InP nanocrystals through the use of fluorine compounds. The process disclosed by Talapin utilized size-selective precipitation followed by treatment with HF in combination with illumination using a long, pass filter which allowed for the reproducible preparation of monodisperse fractions of InP nanocrystals whose band edge emissions were tunable from approximately 1.7 nm to 6.5 nm. The etching process used in Talapin effectively removed phosphorus dangling bonds. Unfortunately, as explained in Mushonga, P., et al., *J. Nanomaterials* 2012:Article ID 869284 (2012), pre-etching the InP cores before shell growth resulted in poor core/shell structures as the remaining fluorine blocked the surface of the quantum dots.

A need exists to find a synthetic method that improves the morphology of the core material for nanoparticles. The present invention provides methods applicable to producing quantum dots having substantially improved sphericity. The present invention focuses on the treatment of quantum dot cores using an acid etching and/or annealing treatment. The treatment results in cores with less surface defects and better morphology. After coating the treated cores with shelling material, highly luminescent spherical core/shell dots are formed—for example, ZnSe/ZnS, CaSe/ZnSSe/ZnS, and InP/ZnSeS/ZnS.

BRIEF SUMMARY OF THE INVENTION

The present invention is directed to a method of producing a nanostructure comprising:
(a) contacting a nanocrystal core with an organic acid, wherein the molar ratio of the nanocrystal core to the organic acid is between about 1:1 and about 1:1000; and
(b) heating (a) at a temperature between about 50° C. and about 250° C. to provide a nanostructure with increased sphericity compared to the starting nanocrystal core.

In some embodiments, the nanocrystal core is a InP, InZnP, InGaP, CdSe, CdS, CdSSe, CdZnSe, CdZnS, ZnSe, ZnSSe, InAs, InGaAs, or InAsP nanocrystal. In some embodiments, the nanocrystal core is a InP nanocrystal.

In some embodiments, the organic acid is a carboxylic acid, a phosphonic acid, or a sulfonic acid. In some embodiments, the organic acid is selected, from the group consisting of lauric acid, hexanoic acid, oleic acid, trifluoromethanesulfonic acid, octyl phosphonic acid, 2-ethylhexanoic acid, myristic acid, decanoic acid, palmitic acid, stearic acid, linoleic acid, and mixtures thereof. In some embodiments, the organic acid is lauric acid.

In some embodiments, the heating of the nanocrystal and organic acid is conducted for between about 1 minute and about 6 hours. In some embodiments, the heating of the nanocrystal core and organic acid is conducted for between about 10 minutes and about 50 minutes.

In some embodiments, the heating of the nanocrystal core and organic acid is at a temperature between about 50° C. and about 100° C.

In some embodiments, the molar ratio of the nanocrystal core to the organic acid is between about 1:2 to about 1:1000. In some embodiments, the molar ratio of the nanocrystal core to the organic acid is between about 1:5 to about 1:1000.

In some embodiments, the nanostructure produced is substantially spherical. In some embodiments, the nanostructure produced in (b) shows an increase in sphericity compared to the starting nanocrystal core in (a). In some embodiments, the nanostructure produced shows an increase in sphericity compared to the starting nanocrystal core of between about 1% and about 10%.

In some embodiments, the nanostructure is used in subsequent steps without purification.

The present invention is directed to a method of increasing the sphericity of a nanostructure comprising:
(a) contacting a nanocrystal core with an organic acid, wherein the molar ratio of the nanocrystal core to the organic acid is between about 1:1 and about 1:1000;
(b) heating (a) at a temperature between about 50° C. and about 250° C. to provide a nanostructure with increased sphericity compared to the starting nanocrystal core; and
(c) heating the nanostructure of (b) at a temperature between about 200° C. and 350° C. for between about 1 minute and 2 hours.

The present invention is directed to a method of increasing the sphericity of a nanostructure comprising:
(a) contacting a nanocrystal core with an organic acid, wherein the molar ratio of the nanocrystal core to the organic acid is between about 1:1 and about 1:1000;
(b) heating (a) at a temperature between about 50° C. and about 250° C. to provide a nanostructure with increased sphericity compared to the starting nanocrystal core;
(c) heating the nanostructure of (b) at a temperature between about 200° C. and 350° C. for between about 1 minute and 2 hours;
(d) contacting the nanostructure of (c) with a shell material; and
(e) heating (d) at a temperature between about 200° C. and about 310° C.; to provide a nanostructure with at least one shell.

The present invention is directed to a method of increasing the sphericity of a nanostructure comprising:
(a) contacting a nanocrystal core with an organic acid, wherein the molar ratio of the nanocrystal core to the organic acid is between about 1:1 and about 1:1000;
(b) heating (a) at a temperature between about 50° C. and about 250° C. to provide a nanostructure with increased sphericity compared to the starting nanocrystal core;
(c) heating the nanostructure of (b) at a temperature between about 200° C. and 350° C. for between about 1 minute and 2 hours;
(d) contacting the nanostructure of (b) with a shell material; and
(e) heating (d) at a temperature between about 200° C. and about 310° C.; to provide a nanostructure with at least one shell.

In some embodiments, the shell material comprises at least two of a zinc source, a sulfur source, a selenium source, and a tellurium source.

In some embodiments, the nanostructure with at least one shell has a full width at half-maximum (FWHM) of between 10 nm and 60 nm. In some embodiments, the nanostructure with at least one shell has a FWHM of between 10 nm and 50 nm.

In some embodiments, the nanostructure with at least one shell displays a photoluminescence quantum yield of between 70% and 99%. In some embodiments, the nanostructure with at least one shell displays a photoluminescence quantum yield of between 75% and 99%.

In some embodiments, the organic acid is lauric acid, the heating of the nanocrystal core and the organic acid is conducted for between about 10 minutes and 50 minutes, and the heating of the nanocrystal core and the organic acid is at a temperature between about 50° C. and about 100° C.

The present invention provides a method of increasing the sphericity of a nanostructure comprising:
(a) heating a nanocrystal core at a temperature between about 150° C. and 350° C. for between about 1 minute and 2 hours to provide a nanostructure with increased sphericity compared to the starting nanocrystal core.

In some embodiments, the nanocrystal core is a InP, InZnP, InGaP, CdSe, CdS, CdSSe, CdZnSe, CdZnS, ZnSe, ZnSSe, InAs, InGaAs, or InAsP nanocrystal. In some embodiments, the nanocrystal core is a InP nanocrystal.

In some embodiments, the heating is conducted for between about 1 minute and about 200 minutes. In some embodiments, the heating is conducted for between about 10 minutes and about 50 minutes.

In some embodiments, the heating is at a temperature between about 150° C. and about 300° C.

The present invention provides a method of increasing the sphericity of a nanostructure comprising:
(a) heating a nanocrystal core at a temperature between about 150° C. and 350° C. for between about 1 minute and 2 hours to provide a nanostructure with increased sphericity compared to the starting nanocrystal core;
(b) contacting the produced nanostructure with an organic acid; and
(c) heating (b) at a temperature between about 50° C. and about 250° C. to provide a nanostructure.

The present invention provides a method of increasing, the sphericity of a nanostructure comprising:
(a) heating a nanocrystal core at a temperature between about 150° C. and 350° C. for between about 1 minute and 2 hours to provide a nanostructure with increased sphericity compared to the starting nanocrystal core;
(b) contacting the produced nanostructure with an organic acid;
(c) heating (b) at a temperature between about 50° C. and about 250° C. to provide a nanostructure;
(d) contacting the produced nanostructure with a shell material; and
(e) heating (d) at a temperature between about 200° C. and about 310° C.; to provide a nanostructure wits at least one shell.

The present invention provides a method of increasing the sphericity of a nanostructure comprising:
(a) heating a nanocrystal core at a temperature between about 150° C. and 350° C. for between about 1 minute and 2 hours to provide a nanostructure with increased sphericity compared to the starting nanocrystal core;
(b) contacting the produced nanostructure with an organic acid;
(c) heating (b) at a temperature between about 50° C. and about 250° C. to provide a nanostructure;
(d) contacting the produced nanostructure with a shell material; and
(e) heating (d) at a temperature between about 200° C. and about 310° C.; to provide a nanostructure with at least one shell.

In some embodiments, the shell material comprises at least one of a zinc source, a sulfur source, a selenium source, and a tellurium source.

In some embodiments, the nanostructure with at least one shell has a full width at half-maximum (FWHM) of between 10 nm and 60 nm. In some embodiments, the nanostructure with at least one shell has a FWHM of between 10 nm and 50 nm.

In some embodiments, the nanostructure with at least one shell displays a quantum yield of between 70% and 99%. In some embodiments, the nanostructure with at least one shell displays a quantum yield of between 75% and 99%.

In some embodiments, the nanocrystal core is heated at a temperature between about 200° C. and 300° C. for between about 1 minute and 200 minutes.

The present invention provides a method of producing a nanostructure comprising:
(a) heating a nanocrystal core at a temperature between about 150° C. and 350° C. for between about 1 minute and 2 hours to provide a nanostructure;
(b) contacting the produced, nanostructure with a shell material; and
(c) heating (d) at a temperature between about 200° C. and about 310° C.; to provide a nanostructure with at least one shell.

In some embodiments, the nanocrystal core is a InP, InZnP, InGaP, CdSe, CdS, CdSSe, CdZnSe, CdZnS, ZnSe, ZnSSe, InAs, InGaAs, or InAsP nanocrystal. In some embodiments, the nanocrystal core is a InP nanocrystal.

In some embodiments, the nanostructure produced in (c) is substantially spherical. In some embodiments, the nanostructure produced in (c) shows an increase in sphericity compared to the starting nanocrystal core in (a). In some embodiments, the nanostructure produced it (c) shows an increase in sphericity compared to the starting nanocrystal core in (a) of between about 1% and about 10%.

In some embodiments, the nanostructure is used in subsequent steps without purification.

In some embodiments, the shell material comprises at least two of a zinc source, a sulfur source, a selenium source, and a tellurium source.

In some embodiments, the nanostructure with at least one shell has a full width at half-maximum (FWHM) of between 10 nm and 60 nm. In some embodiments, the nanostructure with at least one shell has a FWHM of between 10 nm and 50 nm.

In some embodiments, the nanostructure with at least one shell displays a photoluminescence quantum yield between 70% and 99%. In some embodiments, the nanostructure with at least one shell displays a photoluminescence quantum yield between 75% and 99%.

The present invention provides a population of nanostructures comprising at least one shell wherein the population is substantially spherical and has a FWHM of between 10 nm and 60 nm. In some embodiments, the population of nanostructures has a FWHM of between 10 nm and 50 nm.

In some embodiments, the population of nanostructures deviate from a perfect sphere shape by between about 1% and about 8%.

In some embodiments, the population of nanostructures deviate from a perfect sphere shape by between about 1% and about 4%.

In some embodiments, the population of nanostructures displays a photoluminescence quantum yield of between 70% and 99%. In some embodiments, the population of nanostructures displays a photoluminescence quantum yield of between 75% and 99%.

BRIEF DESCRIPTION OF THE DRAWINGS

As shown in FIG. 1, these quantum dots have poor size distribution, sharp corners, and many crystal facets.

As shown in FIG. 2, the absorption of the first exciton peak is blue shifted from 474.5 nm to 455.5 nm after the acid etching treatment—indicating a decrease in size of the InP core.

As shown in FIG. 3, the absorption of the first exciton peak is blue shifted from 465 nm to 450 nm after the acid etching treatment.

FIG. 4 are TEM images of CdSe quantum dots after annealing for 15 minutes in a lauric acid solution at a temperature of (a) 150° C., (b) 230° C., and (c) 295° C. As shown in FIG. 4, the CdSe quantum dots annealed at a higher temperature in (c) have increased sphericity compared to those annealed at a lower temperature in (a).

DETAILED DESCRIPTION OF THE INVENTION

Definitions

Figure 1:
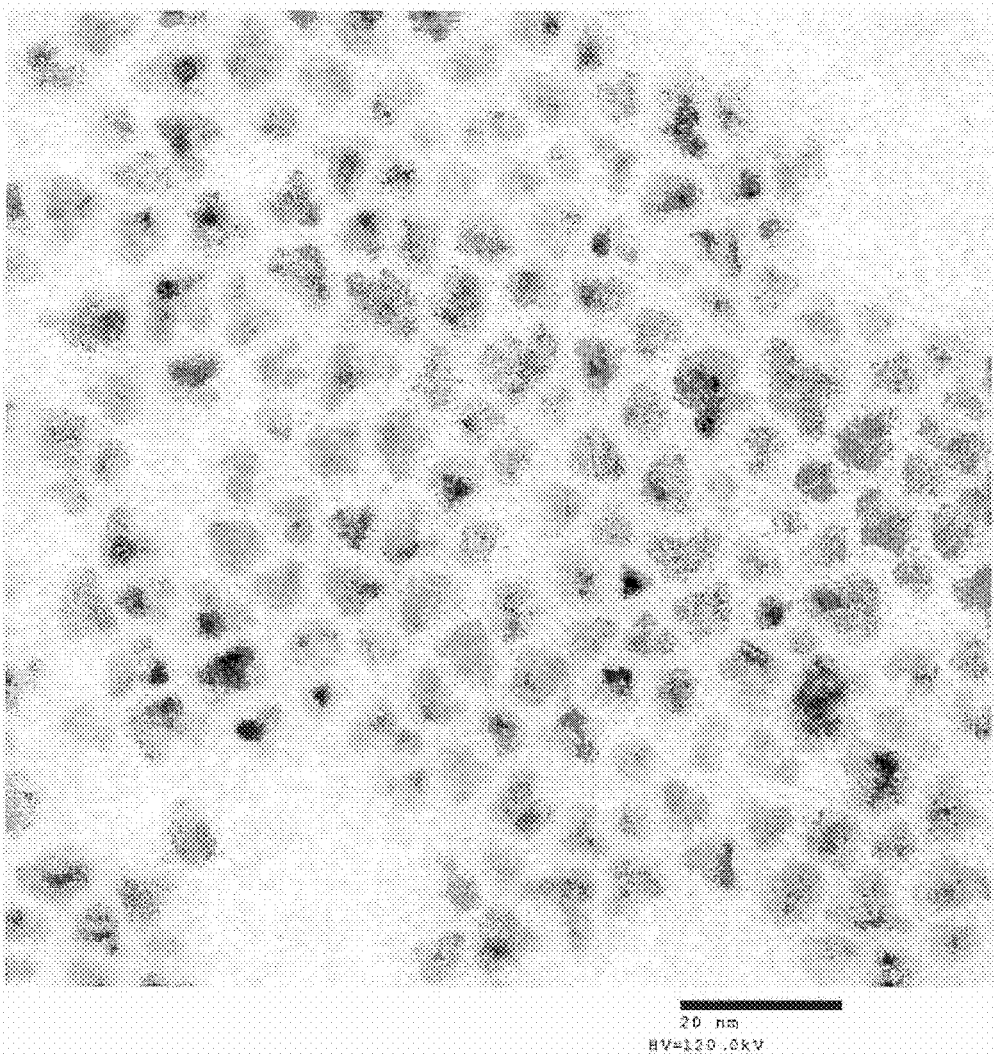
FIG. 1 is a transmission electron micrograph (TEM) of InP quantum dots with a ZnSe shell and a ZnS shell prepared without a core etch step.
Figure 2:
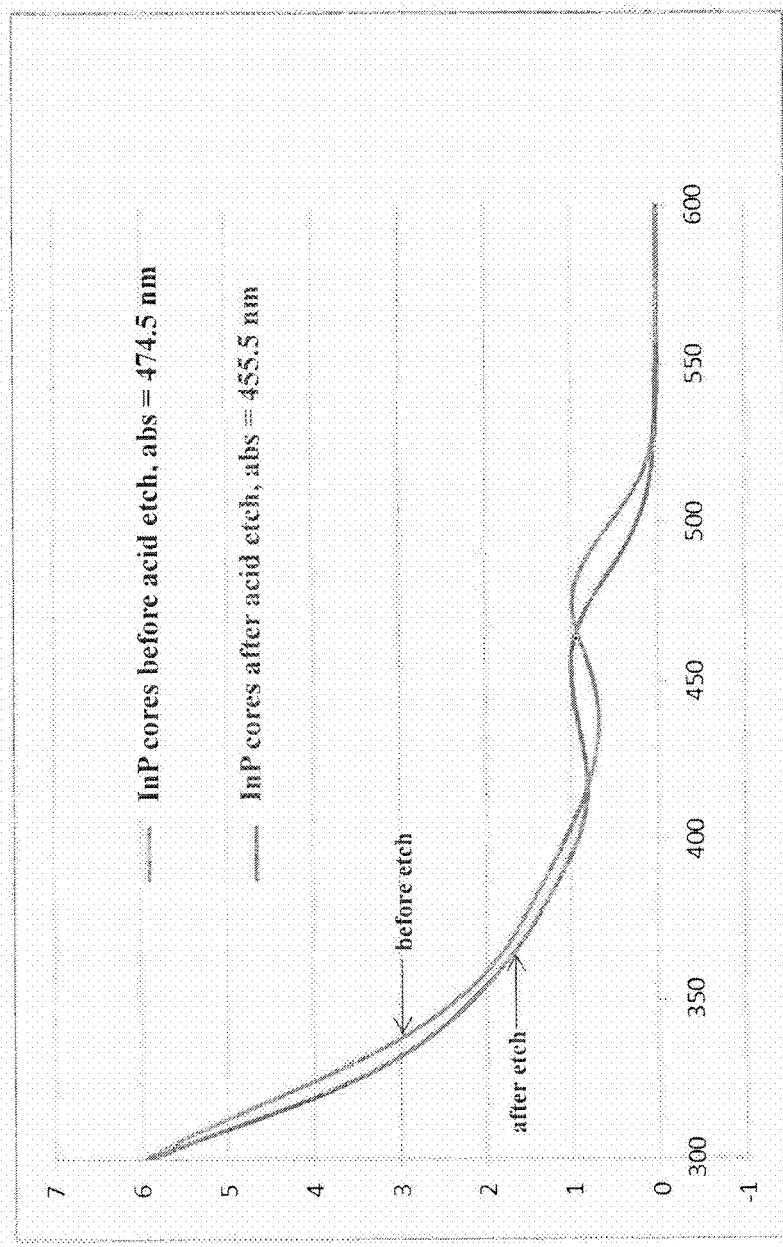
FIG. 2 is a UV-Vis spectra, of green InP cores (A) before an acid etch step and (B) after an acid etch step.

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by ±10% of the value, or optionally ±5% of the value, or in some embodiments, by ±1% of the value so described. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more faces of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from TEM images of nanocrystals before and after a shell synthesis.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{1-4}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

"Optionally substituted alkyl" as used herein refers to an alkyl that is either unsubstituted or substituted with one, two, or three substituents independently chosen from nitro, haloalkoxy, aryloxy, aralkyloxy, alkylthio, sulfonamido, alkylcarbonyl, arylcarbonyl, alkylsulfonyl, arylsulfonyl, carboxy, carboxyalkyl, and cycloalkyl. In one embodiment, the optionally substituted alkyl is substituted with two substituents. In another embodiment, the optionally substituted alkyl is substituted with one substituent. Non-limiting exemplary substituted alkyl groups include —CH$_2$CH$_2$NO$_2$, —CH$_2$SO$_2$CH$_3$CH$_2$CH$_2$CO$_2$H, —CH$_2$CH$_2$SO$_2$CH$_3$, —CH$_2$CH$_2$COPh, and —CH$_2$C$_6$H$_{11}$.

"Aryl" as used herein refers to unsubstituted monocyclic or bicyclic aromatic ring systems having from six to fourteen carbon atoms, i.e., a C6-14 aryl. Non-limiting exemplary aryl groups include phenyl, naphthyl, phenanthryl, anthracyl, indenyl, azulenyl, biphenyl, biphenylenyl, and fluorenyl groups. In one embodiment, the aryl group is a phenyl or naphthyl.

"Optionally substituted aryl" as used herein refers to an aryl that is either unsubstituted or substituted with one to five substituents independently selected from the group consisting of halo, nitro, cyano, hydroxy, amino, alkylamino, dialkylamino, haloalkyl, hydroxyalkyl, alkoxy, haloalkoxy, aryloxy, aralkyloxy, alkylthio, carboxamide, sulfonamido, alkylcarbonyl, arylcarbonyl, alkylsulfonyl, arylsulfonyl, carboxy, carboxyalkyl, alkyl, optionally substituted cycloalkyl, alkenyl, alkynyl, optionally substituted aryl, optionally substituted heteroaryl, optionally substituted heterocyclo, alkoxyalkyl, (amino)alkyl, (carboxamido)alkyl, mercaptoalkyl, and (heterocyclo)alkyl.

"Heteroaryl" or "heteroaromatic" as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen and sulfur. In one embodiment, the heteroaryl contains 1, 2, 3, or 4 heteroatoms independently selected from the group consisting, of oxygen, nitrogen and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H pyrazol-3-yl, 1H-pyrazol-4-yl, and 1H-pyrazol-5-yl), pyridyl (e.g., pyridin-2-yl, pyridin 3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

"Optionally substituted heteroaryl" as used herein refers to a heteroaryl that is either unsubstituted or substituted with one to four substituents, e.g., one or two substituents, independently selected from the group consisting of halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, carboxy, carboxyalkyl, alkyl, optionally substituted cycloalkyl, alkenyl, alkynyl, optionally substituted aryl, optionally substituted heteroaryl, optionally substituted heterocyclo, alkoxyalkyl, (amino)alkyl, (carboxamido)alkyl, mercaptoalkyl, and (heterocyclo)alkyl. In one embodiment, the optionally substituted heteroaryl has one substituent. Any available carbon or nitrogen atom can be substituted.

"Carboxylic acid" as used herein refers to a compound that contains a carboxyl group and has the general formula R—COOH, wherein R is an alkyl, an optionally substituted alkyl, an aryl, an optionally substituted aryl, a heteroaryl, or an optionally substituted heteroaryl.

"Phosphonic acid" as used herein refers to a compound of the general formula R—PO(OH)$_2$, wherein R is an alkyl, an optionally substituted alkyl, an aryl, an optionally substituted aryl, a heteroaryl, or an optionally substituted heteroaryl.

"Sulfonic acid" as used herein refers to a compound with the general formula R—S(O)$_2$—OH, wherein R is an alkyl, an optionally substituted alkyl, an aryl, an optionally substituted aryl, a heteroaryl, or an optionally substituted heteroaryl.

Sphericity is the measure of how spherical (round) an object is—it is a measure of the compactness measure of a shape. Wadell, H., "Volume, Shape, and Roundness of Quartz Particles," *J. of Geology* 43:250-280 (1935), defines sphericity, Ψ, of a particle as the ratio of the surface area of the sphere (with the same volume as the given particle) to the surface area of the particle:

$$\Psi = (\pi^{1/3}(6V_p)^{2/3})/A_p$$

wherein $V_p$ is the volume of the particle and $A_p$ is the surface area of the particle. The sphericity of a sphere is 1 and any particle which is not a sphere will have sphericity of less than 1.

"Substantially spherical" as used herein means that the ratio of the surface area of the sphere (with the same volume as the given nanostructure) to the surface area of the particle is at least 0.9—or 90% when measured as a percentage ratio. Thus, a population of nanostructures that is "substantially spherical" is a population where at least 75% of the nanostructures has surface area that is at least 90% of that of the surface area of a perfect sphere with the same volume as the given particle. And, an individual particle that is "substantially spherical" has a surface area that deviates from the surface area of a perfect sphere (with the same volume as the given particle) by no more than 10%.

When comparing the sphericity of two populations of nanostructures, e.g., before and after an acid etch and/or annealing step, the sphericity of each nanostructure can be measured separately and the two separate measurements compared. Unless clearly indicated otherwise, ranges listed herein are inclusive.

A variety of additional terms are defined or otherwise characterized herein.

Production of the Cores

Methods for colloidal synthesis of a variety of nanostructures are known in the art. Such methods include techniques for controlling nanostructure growth, e.g., to control the size and/or shape distribution of the resulting nanostructures.

In a typical colloidal synthesis, semiconductor nanostructures are produced by rapidly injecting precursors that undergo pyrolysis into a hot solution (e.g., hot solvent and/or surfactant). The precursors can be injected simultaneously or sequentially. The precursors rapidly react to form nuclei. Nanostructure growth occurs through monomer addition to the nuclei, typically at a growth temperature that is lower than the injection/nucleation temperature.

Ligands interact with the surface of the nanostructure. At the growth, temperature, the ligands rapidly adsorb and desorb from the nanostructure surface, permitting the addition and/or removal of atoms from the nanostructure while suppressing aggregation of the growing nanostructures. In general, a ligand that coordinates weakly to the nanostructure surface permits rapid growth of the nanostructure, while a ligand that binds more strongly to the nanostructure surface results in slower nanostructure growth. The ligand can also interact with one (or more) of the precursors to slow nanostructure growth.

Nanostructure growth in the presence of a single ligand typically results in spherical nanostructures. Using a mixture of two or more ligands, however, permits growth to be controlled such that non-spherical nanostructures can be produced, if, for example, the two (or more) ligands adsorb differently to different crystallographic faces of the growing nanostructure.

A number of parameters are thus known to affect nanostructure growth and can be manipulated, independently or in combination, to control the size and/or shape distribution of the resulting nanostructures. These include, e.g., temperature (nucleation and/or growth), precursor composition, time-dependent precursor concentration, ratio of the precursors to each other, surfactant composition, number of surfactants, and ratio of surfactant(s) to each other and/or to the precursors.

The synthesis of Group II-VI nanostructures has been described in U.S. Pat. Nos. 6,225,198, 6,322,901, 6,207,229, 6,607,829, 7,060,243, 7,374,824, 6,861,155, 7,125,605, 7,566,476, 8,158,193, and 8,101,234 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, CdO, CdSe, CdS, CdTe, CdZnSe, HgO, HgSe, HgS, and HgTe. It some embodiments, the core is a nanocrystal selected from the group consisting of ZnSe, ZnS, CdSe, CdZnSe, or CdS.

Although Group II-VI nanostructures such as CdSe and CdS quantum dots can exhibit desirable luminescence behavior, issues such as the toxicity of cadmium limit the applications for which, such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures of the present invention is limited by the trace metal concentration in the precursor materials. The trace metal (including cadmium) concentration in the precursor materials for the Cd-free nanostructures, is measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is a InP nanocrystal.

The synthesis of Group III-V nanostructures has been described in U.S. Pat. Nos. 5,505,928, 6,306,736, 6,576,291, 6,788,453, 6,821,337, 7,138,0987, 7,557,028, 8,062,967, 7,645,397, and 8,282,412 and in U.S. Patent Appl. Publication No. 2015/236195. Synthesis of Group III-V nanostructures has also been described in Wells, R. L., et al., "The use of tris(trimethylsilyl)arsine to prepare gallium arsenide and indium arsenide," *Chem. Mater.* 1:4-6 (1989) and in Guzelian, A. A., et al., "Colloidal chemical synthesis and characterization of InAs nanocrystal quantum dots," *Appl. Phys. Lett.* 69: 1432-1434 (1996).

Synthesis of InP-based nanostructures has been described, e.g., in Xie, R., et al., "Colloidal InP nanocrystals as efficient emitters covering blue to near-infrared," *J. Am. Chem. Soc.* 129:15432-15433 (2007); Micic, O. I., et al., "Core-shell quantum dots of lattice-matched ZnCdSe$_2$ shells on InP cores: Experiment and theory," *J. Phys. Chem. B* 104:12149-12156 (2000); Liu, Z., et al., "Coreduction colloidal synthesis of III-V nanocrystals: The case of InP," *Angew. Chem. Int. Ed. Engl.* 47:3540-3542 (2008); Li, L. et al., "Economic synthesis of high quality InP nanocrystals using calcium phosphide as the phosphorus precursor," *Chem. Mater.* 20:2621-2623 (2008); D. Battaglia and X. Peng, "Formation of high quality InP and InAs nanocrystals in a noncoordinating solvent," *Nano Letters* 2:1027-1030 (2002); Kim, S., et al., "Highly luminescent InP/GaP/ZnS nanocrystals and their application to white light-emitting diodes," *J. Am. Chem. Soc.* 134:3804-3809 (2012); Nann, T., et al., "Water splitting by visible light: A nanophotocathode for hydrogen production," *Angew. Chem. Int. Ed* 49:1574-1577 (2010); Borchert, H., et al., "Investigation of ZnS passivated InP nanocrystals by XPS," *Nano Letters* 2:151-154 (2002); L. Li and P. Reiss, "One-pot synthesis of highly luminescent InP/ZnS nanocrystals without precursor injection," *J. Am. Chem. Soc.* 130:11588-11589 (2008); Hussain, S., et al. "One-pot fabrication of high-quality InP/ZnS (core/shell) quantum dots and their application to cellular imaging," *Chemphyschem.* 10:1466-1470 (2009); Xu, S., et al., "Rapid synthesis of high-quality InP nanocrystals," *J. Am. Chem. Soc.* 128:1054-1055 (2006), Micic, O. I., et al., "Size-dependent spectroscopy of InP quantum dots," *J. Phys. Chem. B* 101:4904-4912 (1997); Haubold, S., et al., "Strongly luminescent InP/ZnS core-shell nanoparticles," *Chemphyschem.* 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and GaInP$_2$ quantum dots," *J. Phys. Chem.* 99:7754-7759 (1995); Guzelian, A. A., et al., "Synthesis of size-selected, surface-passivated InP nanocrystals," *Phys. Chem.* 100: 7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient, shell quantum dots with enhanced stability," *Chem. Mater.* 23:4459-4463 (2011); and Zan, F., et al., "Experimental studies on blinking behavior of single InP/ZnS quantum dots: Effects of synthetic conditions and WV irradiation," *J. Phys. Chem. C* 116:394-3950 (2012). However, such efforts have had, only limited success in producing InP nanostructures with high quantum yields.

In some embodiments, the cote is doped. In some embodiments, the dopant of the semiconductor nanocrystal comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, CuInS$_2$, CuInSe$_2$, AlN, AlP, AlAs, GaN, GaP, or GaAs.

In some embodiments, the core is purified before deposition of a shell. In some embodiments, the core is filtered to remove precipitate from the core solution.

In some embodiments, the diameter of the core is determined using quantum confinement. Quantum confinement in zero-dimensional nanocrystallites, such as quantum dots, arises from the spatial confinement of electrons within the crystallite boundary. Quantum confinement can be observed once the diameter of the material is of the same magnitude as the de Broglie wavelength of the wave function. The electronic and optical properties of nanoparticles deviate substantially from those of bulk materials. A particle behaves as if it were free when the confining dimension is large compared to the wavelength of the particle. During this state, the bandgap remains at its original energy due to a continuous energy state. However, as the cot fining dimension decreases and reaches a certain limit, typically in nanoscale, the energy spectrum becomes discrete. As a result, the bandgap becomes size-dependent.

In some embodiments, the core is subjected to an acid etching step before deposition of a shell.

In some embodiments, the core is subjected to an annealing step before deposition of a shell.

In some embodiments, the core is subjected to an acid etching step and an annealing step before deposition of a shell.

Acid Etching of the Cores

In some embodiments, the cores are etched with acid prior to depositing one or more shells onto the cores.

In some embodiments, the acid used in the etching is an organic acid. In some embodiments, the organic acid is a carboxylic acid, a phosphonic acid, or a sulfonic acid.

In some embodiments, the acid used in the etching is lauric acid, hexanoic acid, oleic acid, trifluoromethanesulfonic acid, octyl phosphonic acid, 2-ethylhexanoic acid, myristic acid, decanoic acid, palmitic acid, stearic acid, linoleic acid, or mixtures thereof. In some embodiments, the acid used in the etching is lauric acid.

In some embodiments, the concentration of the acid used in the etching is between 0.1 M and 5 M, between 0.1 M and 4 M, between 0.1 M and 3 M, between 0.1 M and 2 M, between 0.1 M and 2 M, between 0.5 M and 5 M, between 0.5 M and 4 M, between 0.5 M and 3 M, between 0.5 M and 2 M, between 0.5 M and 1 M, between 1 M and 5 M, between 1 M and 4 M, between 1 M and 3 M, between 1 M and 2 M, between 2 M and 5 M, between 2 M and 4 M, between 2 M and 3 M, between 3 M and 5 M, between 3 M and 4 M, or between 4 M and 5 M.

In some embodiments, the molar ratio of the nanocrystal core to the acid is between about 1:1 and about 1:1000. In some embodiments, the molar ratio of the nanocrystal core to the acid is between about 1:1 and about 1:1000, between about 1:1 to about 1:500, between about 1:1 to about 1:250, between about 1:1 to about 1:100, between about 1:1 to about 1:50, between about 1:2 to about 1:1000, between about 1:2 to about 1:500, between about 1:2 to about 1:250, between about 1:2 to about 1:100, between about 1:2 to about 1:50, between about 1:5 and about 1:1000, between about 1:5 to about 1:500, between about 1:5 to about 1:250, between about 1:5 to about 1:100, between about 1:5 to about 1:50, between about 1:10 to about 1:1000, between about 1:10 to about 1:500, between about 1:10 to about 1:250, between about 1:10 to about 1:100, or between about 1:10 to about 1:50. In some embodiments, the molar ratio of the nanocrystal core to the acid is, between about 1:5 and about 1:20.

In some embodiments, the temperature of the reaction mixture before addition of an acid is between about 50° C. and about 250° C., between about 50° C. and about 200° C., between about 50° C. and about 150° C., between about 50° C. and about 100° C., between about 100° C. and about 250° C., between about 100° C. and about 200° C., between about 100° C. and about 150° C., between about 150° C. and about 250° C., between about 150° C. and about 200° C., or between about 200° C. and about 250° C. In some embodiments, the temperature of the reaction mixture before addition of an acid is between about 50° C. and about 100° C.

In some embodiments, the acid is added and etching is conducted at a temperature between about 50° C. and about 250° C., between about 50° C. and about 200° C., between about 50° C. and about 150° C., between about 50° C. and about 100° C., between about 100° C. and about 250° C., between about 100° C. and about 200° C., between about 100° C. and about 150° C., between about 150° C. and about 250° C., between about 150° C. and about 200° C., or between about 200° C. and about 250° C. In some embodiments, the etching is conducted at a temperature between about 50° C. and about 100° C.

In some embodiments, the acid etching is conducted for between about 1 minute and, about 6 hours, between about 1 minute and about 2 hours, between about 1 minute and about 1 hour, between about 1 minute and about 40 minutes, between about 1 minute and about 30 minutes, between about 1 minute and about 20 minutes, between about 1 minute and about 10 minutes, between about 10 minutes and about 6 hours, between about 10 minutes and about 2 hours, between about 10 minutes and about 1 hour, between about 10 minutes and about 40 minutes, between about 10 minutes and about 30 minutes, between about 10 minutes and about 20 minutes, between about 20 minutes and about 6 hours, between about 20 minutes and about 2 hours, between about 20 minutes and about 1 hour, between about 20 minutes and about 40 minutes, between about 20 minutes and about 30 minutes, between about 30 minutes and about 6 hours, between about 30 minutes and about 2 hours, between about 30 minutes and about 1 hour, between about 30 minutes and about 40 minutes, between about 40 minutes and about 6 hours, between about 40 minutes and about 2 hours, between about 40 minutes and about 1 hour, between about 1 hour and about 6 hours, between about 1 hour and about 2 hours, or between about 2 hours and about 6 hours. In some embodiments the acid etching is conducted for between about 10 minutes and about 50 minutes.

In some embodiments, the reaction mixture for the etching further comprises an organic solvent. In some embodiments, the organic solvent used in the etching reaction mixture is acetonitrile, acetone, dimethyl sulfoxide, dimethylformamide, ethanol, ethyl acetate, isopropanol, methanol, n-butanol, n-propanol, tetrahydrofuran, or water.

In some embodiments, the etched cores are used in subsequent steps without purification.

In some embodiments, the etched cores are purified before use in subsequent steps. In some embodiments, the etched cores are centrifuged. In some embodiments, an organic solvent is added to the reaction mixture to precipitate the cores from the reaction mixture.

In some embodiments, the organic solvent used to precipitate the cores from the reaction mixture is acetonitrile, acetone, dimethyl sulfoxide, dimethylformamide, ethanol, ethyl acetate, isopropanol, methanol, n-butanol, n-propanol, tetrahydrofuran, or water.

Annealing of the Cores

In some embodiments, the cores are annealed prior to depositing one or more shells.

In some embodiments, the cores are annealed prior to acid etching. In some embodiments, the cores are annealed, after acid etching.

In some embodiments, the temperature of the reaction mixture before annealing is between about 50° C. and about 250° C., between about 50° C. and about 200° C., between about 50° C. and about 150° C., between about 50° C. and about 100° C., between about 100° C. and about 250° C., between about 100° C. and about 200° C., between about 100° C. and about 150° C., between about 150° C. and about 250° C., between about 150° C. and about 200° C., or between about 200° C. and about 250° C. In some embodiments, the temperature of the reaction mixture before annealing is between about 50° C. and about 150° C.

In some embodiments, the core is annealed at a temperature between about 150° C. and about 350° C., between about 150° C. and about 300° C., between about 150° C. and about 250° C., between about 150° C. and about 200° C., between about 200° C. and about 350° C., between about 200° C. and about 300° C., between about 200° C. and about 250° C., between about 250° C. and about 350° C., between about 250° C. and about 300° C., or between about 300° C. and about 350° C. In some embodiments, the core is annealed at a temperature between about 200° C. and about 310° C.

In some embodiments, the annealing is conducted for between about 1 minute and about 6 hours, between about 1 minute and about 2 hours, between about 1 minute and about 1 hour, between about 1 minute and about 40 minutes, between about 1 minute and about 30 minutes, between about 1 minute and about 20 minutes, between about 1 minute and about 10 minutes, between about 10 minutes and about 6 hours, between about 10 minutes and about 2 hours, between about 10 minutes and about 1 hour, between about 10 minutes and about 40 minutes, between about 10 minutes and about 30 minutes, between about 10 minutes and about 20 minutes, between about 20 minutes and about 6 hours, between about 20 minutes and about 2 hours, between about 20 minutes and about 1 hour, between about 20 minutes and about 40 minutes, between about 20 minutes and about 30 minutes, between about 30 minutes and about 6 hours, between about 30 minutes and about 2 hours, between about 30 minutes and about 1 hour, between about 30 minutes and about 40 minutes, between about 40 minutes and about 6 hours, between about 40 minutes and about 2 hours, between about 40 minutes and about 1 hour, between about 1 hour and about 6 hours, between about 1 hour and about 2 hours, or between about 2 hours and about 6 hours. In some embodiments the annealing is conducted for between about 1 minute and about 200 minutes.

In some embodiments, the temperature of the reaction mixture after annealing is between about 50° C. and about 250° C., between about 50° C. and about 200° C., between about 50° C. and about 150° C., between about 50° C. and about 100° C., between about 100° C. and about 250° C., between about 100° C. and about 200° C., between about 100° C. and about 150° C., between about 150° C. and about 250° C., between about 150° C. and about 200° C., or between about 200° C. and about 250° C. In some embodiments, the temperature of the reaction mixture before annealing is between about 100° C. and 150° C.

In some embodiments, the annealed cores are used in subsequent steps without purification.

In some embodiments, the annealed cores are purified before use in subsequent steps. In some embodiments, the cores are centrifuged. In some embodiments, an organic solvent is added to precipitate the cores from the reaction mixture.

In some embodiments, the organic solvent used to precipitate the cores from the reaction mixture is acetonitrile, acetone, dimethyl sulfoxide, dimethylformamide, ethanol, ethyl acetate, isopropanol, methanol, n-butanol, n-propanol, tetrahydrofuran, or water.

Production of a Shell

In some embodiments, the nanostructures of the present invention include a core and, at least one shell. In some, embodiments, the nanostructures of the present invention include a core and at least two shells. The shell can, e.g., increase the quantum yield and/or stability of the nanostructures. In some embodiments, the core and the shell comprise different materials. In some embodiments, the nanostructure comprises shells of different shell material.

In some embodiments, a shell is deposited onto a core or a core/shell(s) that comprises a mixture of Group II and VI materials. In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell material is a mixture of three of a zinc source, a selenium source, a sulfur source, a tellurium source, and a cadmium source. In some embodiments, the shell is a mixture of zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium, zinc, and sulfur; cadmium, zinc, and selenium; or cadmium, zinc, sulfur, and selenium.

The thickness of the shell can be controlled by varying the amount of precursor provided. For a given shell thickness, at least one of the precursors is optionally provided in, an amount whereby, when a growth reaction is substantially complete, a shell of a predetermined thickness is obtained. If more than one different precursor is provided, either the amount of each precursor can be limited or one of the precursors can be provided in a limiting amount while the others are provided in excess.

The thickness of each shell can be determined using techniques known to those of skill in the art. In some embodiments, the thickness of each shell is determined by comparing the average diameter of the nanostructure before and after the addition of each shell. In some embodiments, the average diameter of the nanostructure before and after the addition of each shell is determined by TEM. In some embodiments, each shell has a thickness of between 0.05 nm and 3.5 nm, between 0.05 nm and 2 nm, between 0.05 nm and 0.9 nm, between 0.05 nm and 0.7 nm, between 0.05 nm and 0.5 nm, between 0.05 nm and 0.3 nm, between 0.05 nm and 0.1 nm, between 0.1 nm and 3.5 nm, between 0.1 nm and 2 nm, between 0.1 nm and 0.9 nm, between 0.1 nm and 0.7 nm, between 0.1 nm and 0.5 nm, between 0.1 nm and 0.3 nm, between 0.3 nm and 3.5 nm, between 0.3 nm and 2 nm, between 0.3 nm and 0.9 nm, between 0.3 nm and 0.7 nm, between 0.3 nm and 0.5 nm, between 0.5 nm and 3.5 nm, between 0.5 nm and 2 nm, between 0.5 nm and 0.9 nm, between 0.5 nm and 0.7 nm, between 0.7 nm and 3.5 nm, between 0.7 nm and 2 nm, between 0.7 nm and 0.9 nm, between 0.9 nm and 3.5 nm, between 0.9 nm and 2 nm, or between 2 nm and 3.5 nm.

In some embodiments, each shell is synthesized in the presence of at least one nanostructure ligand. Ligands can, e.g., enhance the miscibility of nanostructures in solvents or polymers (allowing the nanostructures to be distributed throughout a composition such that the nanostructures do not aggregate together), increase quantum yield of nanostructures, and/or preserve nanostructure luminescence (e.g., when the nanostructures are incorporated into a matrix). In some embodiments, the ligand(s) for the core synthesis and for the shell synthesis are the same. In some embodiments, the ligand(s) for the core synthesis and for the shell synthesis are different. Following synthesis, any ligand on the surface of the nanostructures can be exchanged for a different ligand with other desirable properties. Examples of ligands are disclosed in U.S. Pat. Nos. 7,572,395, 8,143,703, 8,425,803, 8,563,133, 8,916,064, 9,005,480, 9,139,770, and 9,169,435, and in U.S. Patent Application Publication No. 2008/0118755.

Ligands suitable for the synthesis of a shell are known by those of skill in the art. In some embodiments, the ligand is a fatty acid selected from the group consisting of lauric acid, caproic acid, myristic acid, palmitic acid, stearin acid, and oleic acid. In some embodiments, the ligand is an organic phosphine or an organic phosphine oxide selected from trioctylphosphine oxide (TOPO), trioctylphosphine (TOP), diphenylphosphine (DPP), triphenylphosphine oxide, and tributylphosphine oxide. In some embodiments, the ligand is an amine selected from the group consisting of dodecylamine, oleylamine, hexadecylamine, dioctylamine, and octadecylamine. In some embodiments, the ligand is tributylphosphine, oleic acid, or zinc oleate.

In some embodiments, each shell is produced in the presence of a mixture of ligands. In some embodiments, each shell is produced in the presence of a mixture comprising 2, 3, 4, 5, or 6 different ligands. In some embodiments, each shell is produced in the presence of a mixture comprising 3 different ligands. In some embodiments, the mixture of ligands comprises tributylphosphine, oleic acid, and zinc oleate.

In some embodiments, each shell is produced in the presence of a solvent. In some embodiments, the solvent is selected from the group consisting of 1-octadecene, 1-hexadecene, 1-eicosene, eicosane, octadecane, hexadecane, tetradecane, squalene, squalane, trioctylphosphine oxide, and dioctyl ether. In some embodiments, the solvent is 1-octadecene.

In some embodiments, a core or a core/shell(s) and shell precursor are contacted at an addition temperature between 20° C. and 310° C., between 20° C. and 280° C., between 20° C. and 250° C., between 20° C. and 200° C., between 20° C. and 150° C., between 20° C. and 100° C., between 20° C. and 50° C., between 50° C. and 310° C., between 50° C. and 280° C., between 50° C. and 250° C., between 50° C. and 200° C., between 50° C. and 150° C., between 50° C. and 100° C., between 100° C. and 310° C., between 100° C. and 280° C., between 100° C. and 250° C., between 100° C. and 200° C., between 100° C. and 150° C., between 150° C. and 310° C., between 150° C. and 280° C., between 150° C. and 250° C., between 150° C. and 200° C., between 200° C. and 310° C., between 200° C. and 280° C., between 200° C. and 250° C., between 250° C. and 310° C., between 250° C. and 280° C., or between 280° C. and 310° C. In some embodiments, a core or a core/shell(s) and shell precursor are contacted at an addition temperature between 20° C. and 100° C.

In some embodiments, after contacting a core or core/shell(s) and shell precursor, the temperature of the reaction mixture is increased to an elevated temperature between 200° C. and 310° C., between 200° C. and 280° C., between 200° C. and 250° C., between 200° C. and 220° C., between 220° C. and 310° C., between 220° C. and 280° C., between 220° C. and 250° C., between 250° C. and 310° C., between 250° C. and 280° C., or between 280° C. and 310° C. In some embodiments, after contacting, a core or core/shell(s) and shell precursor, the temperature of the reaction mixture is increased to between 250° C. and 310° C.

In some embodiments, after contacting a core or core/shell(s) and shell precursor, the time for the temperature to reach the elevated temperature is between 2 and 240 minutes, between 2 and 200 minutes, between 2 and 100 minutes, between 2 and 60 minutes, between 2 and 40 minutes, between 5 and 240 minutes, between 5 and 200 minutes, between 5 and 100 minutes, between 5 and 60 minutes, between 5 and 40 minutes, between 10 and 240 minutes, between 10 and 200 minutes, between 10 and 100 minutes, between 10 and 60 minutes, between 10 and 40 minutes, between 40 and 240 minutes, between 40 and 200 minutes, between 40 and 100 minutes, between 40 and 60 minutes, between 60 and 240 minutes, between 60 and 200 minutes, between 60 and 100 minutes, between 100 and 240 minutes, between 100 and 200 minutes, or between 200 and 240 minutes.

In some embodiments, after contacting a core or core/shell(s) and shell precursor, the temperature of the reaction mixture is maintained at an elevated temperature for between 2 and 240 minutes, between 2 and 200 minutes, between 2 and 100 minutes, between 2 and 60 minutes, between 2 and 40 minutes, between 5 and 240 minutes, between 5 and 200 minutes, between 5 and 100 minutes, between 5 and 60 minutes, between 5 and 40 minutes, between 10 and 240 minutes, between 10 and 200 minutes, between 10 and 100 minutes, between 10 and 60 minutes, between 10 and 40 minutes, between 40 and 240 minutes, between 40 and 200 minutes, between 40 and 100 minutes, between 40 and 60 minutes, between 60 and 240 minutes, between 60 and 200 minutes, between 60 and 100 minutes, between 100 and 240 minutes, between 100 and 200 minutes, or between 200 and 240 minutes. In some embodiments, after contacting a core or core/shell(s) and shell precursor, the temperature of the reaction mixture is maintained at an elevated temperature for between 30 and 120 minutes.

In some embodiments, additional shells are produced by further additions of shell material precursors that are added to the reaction mixture followed by maintaining at an elevated temperature. Typically, additional shell precursor is provided after reaction of the previous shell is substantially complete (e.g., when at least one of the previous precursors is depleted or removed from the reaction or when no additional growth is detectable). The further additions of precursor create additional shells.

In some embodiments, the nanostructure is cooled before the addition of additional shell material precursor to provide further shells. In some embodiments, the nanostructure is maintained at an elevated temperature before the addition of shell material precursor to provide further shells.

After sufficient amounts of shell have been added for the nanostructure to reach the desired thickness and, diameter, the nanostructure can be cooled. In some embodiments, the core/shell(s) nanostructures are cooled to room temperature. It some embodiments, an organic solvent is added to dilute the reaction mixture comprising the core/shell(s) nanostructures.

In some embodiments, the organic solvent used to dilute the reaction mixture is ethanol, hexane, pentane, toluene, benzene, diethylether, acetone, ethyl acetate, dichloromethane (methylene chloride), chloroform, dimethylformamide, or N-methylpyrrolidinone. In some embodiments, the organic solvent is toluene.

In some embodiments, core/shell(s) nanostructures are isolated. In some embodiments, the core/shell(s) nanostructures are isolated by precipitation using an organic solvent. In some embodiments, the core/shell(s) nanostructures are isolated by flocculation with ethanol.

The size of the core/shell(s) nanostructures can be determined using techniques known to those of skill in the art. In some embodiments, the size of the core/shell(s) nanostructures is determined using TEM. In some embodiments, the core/shell(s) nanostructures have an average diameter of between 1 nm and 15 nm, between 1 nm and 10 nm, between 1 nm and 9 nm, between 1 nm and 8 nm, between 1 nm and 7 nm, between 1 nm and 6 nm, between 1 nm and 5 nm, between 5 nm and 15 nm, between 5 nm and 10 nm, between 5 nm and 9 nm, between 5 nm and 8 nm, between 5 nm and 7 nm, between 5 nm and 6 nm, between 6 nm and 15 nm, between 6 nm and 10 nm, between 6 nm and 9 nm, between 6 nm and 8 nm, between 6 nm and 7 nm, between 7 nm and 15 nm, between 7 nm and 10 nm, between 7 nm and 9 nm, between 7 nm and 8 nm, between 8 nm and 15 nm, between 8 nm and 10 nm, between 8 nm and 9 nm, between 9 nm and 15 nm, between 9 nm and 10 nm, or between 10 nm and 15 nm. In some embodiments, the core/shell(s) nanostructures have an average diameter of between 6 nm and 7 nm.

In some embodiments, the core/shell(s) nanostructure is subjected to an acid etching step before deposition of an additional shell.

Production of a ZnSe Shell

In some embodiments, the shell deposited onto the core or core/shell(s) nanostructure is a ZnSe shell.

In some embodiments, the shell precursor contacted with a core or core/shell(s) nanostructure to prepare a ZnSe shell comprise a zinc source and a selenium source.

In some embodiments, the zinc source is a dialkyl zinc compound. In some embodiments, the zinc source is a zinc carboxylate. In some embodiments, the zinc source is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate zinc oxide, zinc peroxide, zinc perchlorate, zinc sulfate, zinc hexanoate, zinc octanoate, zinc, laurate, zinc myristate, zinc palmitate, zinc stearate, zinc dithiocarbamate, or mixtures thereof. In some embodiments, the zinc source is zinc oleate, zinc hexanoate, zinc octanoate, zinc laurate, zinc myristate, zinc palmitate, zinc stearate, zinc dithiocarbamate, or mixtures thereof. In some embodiments, the zinc source is zinc oleate.

In some embodiments, the selenium source is an alkyl-substituted selenourea. In some embodiments, the selenium source is a phosphine selenide. In some embodiments, the selenium source is selected from trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, tricyclohexylphosphine selenide, cyclohexylphosphine selenide, 1-octaneselenol, 1-dodecaneselenol, selenophenol, elemental selenium, hydrogen selenide, bis(trimethylsilyl) selenide, selenourea, and mixtures thereof. In some embodiments, the selenium source is tri(n-butyl)phosphine selenide, tri(sec-butyl)phosphine selenide, or tri(tert-butyl)phosphine selenide. In some embodiments, the selenium source is trioctylphosphine selenide.

Production of a $ZnSe_xS_{1-x}$ Shell

In some embodiments, the highly luminescent nanostructures include a shell layer between an inner shell and an outer shell. In some embodiments, the nanostructure comprises a $ZnSe_xS_{1-x}$ shell, wherein 0<x<1.

In some embodiments, the nanostructure comprises a $ZnSe_xS_{1-x}$ shell, wherein x is between 0 and 1. In some embodiments, x is between 0.01 to 0.99. In some embodiments, x is between 0.25 and 1, between 0.25 and 0.75, between 0.25 and 0.5, between 0.5 and 1, between 0.5 and 0.75, or between 0.75 and 1. In some embodiments, x is 0.5.

In some embodiments, the $ZnSe_xS_{1-x}$ shell eases lattice strain between a ZnSe shell and a ZnS shell.

In some embodiments, the x of the $ZnSe_xS_{1-x}$ shell gradually decreases from the interior to the exterior of the resulting nanostructure.

In some embodiments, the shell precursor contacted with a core or core/shell to prepare a layer of a $ZnSe_xS_{1-x}$ shell comprise a zinc source, a selenium source, and a sulfur source.

In some embodiments, the zinc source is a dialkyl zinc compound. In some embodiments, the zinc source is a zinc carboxylate. In some embodiments, the zinc source is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source is zinc oleate, zinc hexanoate, zinc octanoate, zinc laurate, zinc myristate, zinc palmitate, zinc stearate, zinc dithiocarbamate, or mixtures thereof. In some embodiments, the zinc source is zinc oleate.

In some embodiments, the selenium source is an alkyl-substituted selenourea. In some embodiments, the selenium source is a phosphine selenide. In some embodiments, the selenium source is selected from trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, tricyclohexylphosphine selenide, cyclohexylphosphine selenide, 1-octaneselenol, 1-dodecaneselenol, selenophenol, elemental selenium, hydrogen selenide, bis(trimethylsilyl) selenide, selenourea, and mixtures thereof. In some embodiments, the selenium source is tri(n-butyl)phosphine selenide, tri(sec-butyl)phosphine selenide, or tri(tert-butyl)phosphine selenide. In some embodiments, the selenium source is trioctylphosphine selenide.

In some embodiments, the sulfur source is selected from elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, and mixtures thereof. In some embodiments, the sulfur source is an alkyl-substituted zinc dithiocarbamate. In some embodiments, the sulfur source is octanethiol.

Production of a ZnS Shell

In some embodiments, the shell, deposited onto the core or core/shell(s) nanostructure is a ZnS shell.

In some embodiments, the shell precursor contacted with a core or core/shell(s) nanostructure to prepare a ZnS shell comprise a zinc source and a sulfur source.

In some embodiments, the ZnS shell passivates defects at the particle surface, which leads to an improvement in the quantum yield and to higher efficiencies when used in devices such as LEDs and lasers. Furthermore, spectral impurities which are caused by defect states may be eliminated by passivation, which increases the color saturation.

In some embodiments, the zinc source is a dialkyl zinc compound. In some embodiments, the zinc source is a zinc carboxylate. In some embodiments, the zinc source is diethylzinc, dimethylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zit c peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source is zinc oleate, zinc hexanoate, zinc octanoate, zinc laurate, zinc myristate, zinc palmitate, zinc stearate, zinc dithiocarbamate, or mixtures thereof. In some embodiments, the zinc source is zinc oleate.

In some embodiments, the zinc source is produced by reacting a zinc salt with a carboxylic acid. In some embodiments, the carboxylic acid is selected from acetic acid, propionic acid, butyric acid, valeric acid, caproic acid, heptanoic acid, caprylic acid, capric acid, undecanoic acid, lauric acid, myristic acid, palmitic acid, stearic acid, behenic acid, acrylic acid, methacrylic acid, but-2-enoic acid, but- 3-enoic acid, pent-2-enoic acid, pent-4-enoic acid, hex-2-enoic acid, hex-3-enoic acid, hex-4-enoic acid, hex-5-enoic acid, hept-6-enoic acid, oct-2-enoic acid, dec-2-enoic acid, undec-10-enoic acid, dodec-5-enoic acid, oleic acid, gadoleic acid, erucic acid, linoleic acid, α-linolenic acid, calendic acid, eicosadienoic acid, eicosatrienoic acid, arachidonic acid, stearidonic acid, benzoic acid, para-toluic acid, ortho-toluic acid, meta-toluic acid, hydrocinnamic acid, naphthenic acid, cinnamic acid, para-toluenesulfonic acid, and mixtures thereof.

In some embodiments, the sulfur source is selected from elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, and mixtures thereof. In some embodiments, the sulfur source is an alkyl-substituted zinc dithiocarbamate. In some embodiments, the sulfur source is octanethiol.

Acid Etching of the Core/Shell Nanostructures

In some embodiments, the core/shell(s) nanostructure is etched with acid prior to depositing an additional shell.

In some embodiments, the acid used in the etching is an organic acid. In some embodiments, the organic acid is a carboxylic acid, a phosphonic acid, or a sulfonic acid.

In some embodiments, the acid used in the etching is lauric acid, hexanoic acid, oleic acid, trifluoromethansulfonic acid, octyl phosphonic acid, 2-ethylhexanoic acid, myristic acid, decanoic acid, palmitic acid, steal is acid, linoleic acid, or mixtures thereof. In some embodiments, the acid used in the etching is lauric acid.

In some embodiments, the concentration of the acid used in the etching is between 0.1 M and 5 M, between 0.1 M and 4 M, between 0.1 M and 3 M, between 0.1 M and 2 M, between 0.1 M and 2 M, between 0.5 M and 5 M, between 0.5 M and 4 M, between 0.5 M and 3 M, between 0.5 M and 2 M, between 0.5 M and 1 M, between 1 M and 5 M, between 1 M and 4 M, between 1 M and 3 M, between 1 M and 2 M, between 2 M and 5 M, between 2 M and 4 M, between 2 M and 3 M, between 3 M and 5 M, between 3 M and 4 M, or between 4 M and 5 M.

In some embodiments, the temperature of the reaction mixture before addition of an acid is between about 50° C. and about 250° C., between about 50° C. and about 200° C., between about 50° C. and about 150° C., between about 50° C. and about 100° C., between about 100° C. and about 250° C., between about 100° C. and about 200° C., between about 100° C. and about 150° C., between about 150° C. and about 250° C., between about 150° C. and about 200° C., or between about 200° C. and about 250° C. In some embodiments, the temperature of the reaction mixture before addition of an acid is between about 50° C. and about 100° C.

In some embodiments, the acid is added and etching is conducted at a temperature between about 50° C. and about 230° C., between about 50° C. and about 200° C., between about 50° C. and about 150° C., between about 50° C. and about 100° C., between about 100° C. and about 250° C., between about 100° C. and about 200° C., between about 100° C. and about 150° C., between about 150° C. and about 250° C., between about 150° C. and about 200° C., or between about 200° C. and about 250° C.

In some embodiments, the acid etching is conducted for between about 1 minute and about 6 hours, between about 1 minute and about 2 hours, between about 1 minute and about 1 hour, between about 1 minute and about 40 minutes, between about 1 minute and about 30 minutes, between about 1 minute and about 20 minutes, between about 1 minute and about 10 minutes, between about 10 minutes and about 6 hours, between about 10 minutes and about 2 hours, between about 10 minutes and about 1 hour, between about 10 minutes and about 40 minutes, between about 10 minutes and about 30 minutes, between about 10 minutes and about 20 minutes, between about 20 minutes and about 6 hours, between about 20 minutes and about 2 hours, between about 20 minutes and about 1 hour, between about 20 minutes and about 40 minutes, between about 20 minutes and about 30 minutes, between about 30 minutes and about 6 hours, between about 30 minutes and about 2 hours, between about 30 minutes and about 1 hour, between about 30 minutes and about 40 minutes, between about 40 minutes and about 6 hours, between about 40 minutes and about 2 hours, between about 40 minutes and about 1 hour, between about 1 hour and about 6 hours, between about 1 hour and about 2 hours, or between about 2 hours and about 6 hours. In some embodiments the acid etching is conducted for between about 10 minutes and about 30 minutes.

In some embodiments, the reaction mixture for the etching further comprises an organic solvent. In some embodiments, the organic solvent used in the etching reaction mixture is acetonitrile, acetone, dimethyl sulfoxide, dimethylformamide, ethanol, ethyl acetate, isopropanol, methanol, n-butanol, n-propanol, tetrahydrofuran, or water.

In some embodiments, the etched core/shell(s) nanostructures are used in subsequent steps without purification.

In some embodiments, the etched core/shell(s) nanostructures are purified before use in subsequent steps. In some embodiments, the etched core/shell(s) nanostructures are centrifuged. In some embodiments, an organic solvent is added to the reaction mixture to precipitate the core/shell nanostructures from the reaction mixture.

In some embodiments, the organic solvent used to precipitate the core/shell(s) nanostructures from the reaction mixture is acetonitrile, acetone, dimethyl sulfoxide, dimethylformamide, ethanol, ethyl acetate, isopropanol, methanol, n-butanol, n-propanol, tetrahydrofuran, or water.

Core/Shell(s) Nanostructures

In some embodiments, the core/shell(s) nanostructure is a core/ZnSe/ZnS nanostructure or a core/ZnSe/ZnSe$_x$S$_{1-x}$/ZnS nanostructure. In some embodiments, the core/shell(s) nanostructure is a InP/ZnSe/ZnS nanostructure, or a core/ZnSe/ZnSe$_x$S$_{1-x}$/ZnS nanostructure.

In some embodiments, the core/shell(s) nanostructures display a high photoluminescence quantum yield. In some embodiments, the core/shell(s) nanostructures display a photoluminescence quantum yield of between 60% and 99%, between 60% and 95%, between 60% and 90%, between 60% and 85%, between 60% and 80%, between 60% and 70%, between 70% and 99%, between 70% and 95%, between 70% and 90%, between 70% and 85%, between 70% and 80%, between 75% and 99%, between 75% and 95%, between 75% to 90%, between 75% and 85%, between 75% and 80%, between 80% and 99%, between 80% and 95%, between 80% to 90%, between 80% and 85%, between 85% and 99%, between 85% and 95%, between 80% and 85%, between 85% and 99%, between 85% and 90%, between 90% and 99%, between 90% and 95%, or between 95% and 99%. In some embodiments, the core/shell(s) nanostructures display a photoluminescence quantum yield of between 75% and 96%.

The photoluminescence spectrum of the core/shell(s) nanostructures can cover essentially any desired portion of the spectrum. In some embodiments, the photoluminescence spectrum for the core/shell(s) nanostructures have a emission maximum between 300 nm and 750 nm, between 300 nm and 650 nm, between 300 nm and 550 nm, between 300 nm and 450 nm, between 450 nm and 750 nm, between 450 nm and 650 nm, between 450 nm and 550 nm, between 450 nm and 750 nm, between 450 nm and 650 nm, between 450 nm and 550 nm, between 550 nm and 750 nm, between 550 nm and 650 nm, or between 650 nm and 750 nm. In some embodiments, the photoluminescence spectrum for the core/shell(s) nanostructures has an emission maximum of between 500 nm and 550 nm. In some embodiments, the photoluminescence spectrum for the core/shell(s) nanostructures has an emission maximum of between 600 nm and 650 nm.

The size distribution of the core/shell(s) nanostructures can be relatively narrow. In some embodiments, the photoluminescence spectrum of the population or core/shell(s) nanostructures can have a full width at half maximum of between 10 nm and 60 nm, between 10 nm and 40 nm, between 10 nm and 30 nm, between 10 nm and 20 nm, between 20 nm and 60 nm, between 20 nm and 40 nm, between 20 nm and 30 nm, between 30 nm and 60 nm, between 30 nm and 40 nm, or between 40 nm and 60 nm. In some embodiments, the photoluminescence spectrum of the population or core/shell(s) nanostructures can have a full width at half maximum of between 35 nm and 45 nm.

In some embodiments, the core/shell(s) nanostructures of the present invention are able to maintain high levels of photoluminescence intensity for long periods of time under continuous blue light exposure. In some embodiments, the core/shell(s) nanostructrures are able to maintain 90% intensity (compared to the starting intensity level) of at least 2,000 hours, at least 4,000 hours, at least 6,000 hours, at least 8,000 hours, or at least 10,000 hours. In some embodiments, the core/shell(s) nanostructures are able to maintain 80% intensity (compared to the starting intensity level) of at least 2,000 hours, at least 4,000 hours, at least 6,000 hours, at least 8,000 hours, or at least 10,000 hours. In some embodiments, the core/shell(s) nanostructures are able to maintain 70% intensity (compared to the starting intensity level) of at least 2,000 hours, at least 4,000 hours, at least 6,000 hours, at least 8,000 hours, or at least 10,000 hours.

The resulting core/shell(s) nanostructures are optionally embedded in a matrix (e.g., an organic polymer, silicon-containing polymer, inorganic, glassy, and/or other matrix), used in production of a nanostructure phosphor, and/or incorporated into a device, e.g., an LED, backlight, downlight, or other display or lighting unit or an optical filter. Exemplary phosphors and lighting, units can, e.g., generate, a specific color light by incorporating a population of nanostructures with an emission maximum at or near the desired wavelength or a wide color gamut by incorporating two or more different populations of nanostructures having different emission maxima. A variety of suitable matrices are known in the art. See, e.g., U.S. Pat. No. 7,068,898 and U.S. Patent Application Publication Nos. 2010/0276638, 2007/0034833, and 2012/0113672. Exemplary nanostructure phosphor films, LEDs, backlighting units, etc. are described, e.g., in U.S. Patent Application Publications Nos. 2010/0276638, 2012/0113672, 2008/0237540, 2010/0110728, and 2010/0155749 and U.S. Pat. Nos. 7,374,807, 7,645,397, 6,501,091, and 6,803,719.

The relative molar ratios of InP, ZnSe, and ZnS are calculated based on a spherical InP core of a given diameter by measuring the volumes, masses, and thus molar amounts of the desired spherical shells. For example, a green InP core of 1.8 nm diameter coated with ZnSe and ZnS requires 9.2 molar equivalents of ZnSe and 42.8 molar equivalents of ZnS relative to the molar amount of InP bound in the cores. This shell structure results in a total particle diameter of 6.23 nm.

The resulting cote/shell(s) nanostructures can be used for imaging or labeling, e.g., biological imaging, or labeling. Thus, the resulting core/shell(s) nanostructures are optionally covalently or noncovalently bound to biomolecule(s), including, but not limited to, a peptide or protein (e.g., an antibody or antibody domain, avidin, streptavidin, neutravidin, or other binding or recognition molecule), a ligand (e.g., biotin), a polynucleotide (e.g., a short oligonucleotide or longer nucleic acid), a carbohydrate, or a lipid (e.g., a phospholipid or other micelle). One or more core/shell(s) nanostructures can be bound to each biomolecule, as desired for a given application. Such core/shell(s) nanostructure-labeled biomolecules find use, for example, in vitro, in vivo, and in cellulo, e.g., in exploration of binding or chemical reactions as well as ii subcellular, cellular, and organismal labeling.

Core/shell(s) nanostructures resulting from the methods are also a feature of the invention. Thus, one class of embodiments provides a population of core/shell(s) nanostructures. In some embodiments, the core/shell(s) nanostructures are quantum dots.

Measuring the Sphericity of the Nanoparticles

Methods for measuring the sphericity of the nanoparticles are known to those skilled in the art. In some embodiments, a metric for particle shape uniformity or sphericity may be obtained by using TEM images. TEM is an imaging technique whereby a beam of electrons is transmitted through a specimen, and an image is formed, magnified, and directed to appear either on a fluorescent screen or a layer of photographic film, or detected by a sensor, such as a charge coupled device (CCD) camera. TEM can yield information about the nanoparticles such as particle size, size distribution, and morphology of the nanoparticles.

In some embodiments, the sphericity of the nanoparticles is measured using a particle sizing system with a dynamic light scattering, principle as disclosed in Chen, L.-C., et al., "Development of Nanoparticle Shape Measurement and Analysis for Process Characterization of $TiO_2$ Nanoparticle Synthesis," *Rev. Adv. Mater. Sci.* 18:677-684 (2008). And, Chen discloses that further analysis of particles can be measured using TEM and developed image analysis techniques to detect the sphericity and form uniformity. Chen discloses that the sphericity of each particle contour can be calculated using an algorithm that compares the dissimilarity between the maximum and minimum radii of the particles.

Using Chen's method, TEM can be applied to detect particle contours for roundness evaluation—accurate particle contours can be reliably detected by Laplacian edge detection with a subpixeling resolution up to $1/50$ pixel. The particle contours of the nanostructures can be evaluated using a detected particle image obtained by TEM. The sphericity of each particle contour is subsequently calculated using a developed minimum/maximum fitting algorithm where the degree of particle roundness is defined as the dissimilarity between the maximum and minimum radii of the circles enclosed in the detected contour. The calculated value must be normalized due to the fact that it is proportional to the diameter of the particle.

In some embodiments, the particles are substantially spherical. In some embodiments, substantially spherical refers to a particle average that deviates from a perfect sphere shape by between about 1% and about 10%, between about 1% and about 8%, between about 1% and about 6%, between about 1% and about 4%, between about 1% and about 2%, between about 2% and about 10%, between about 2% and about 8%, between about 2% and about 6%, between about 2% and about 4%, between about 4% and about 10%, between about 4% and about 8%, between about 4% and about 6%, between about 6% and about 10%, between about 6% and about 8%, or between about 8% and about 10%.

In some embodiments, the particle average after the acid etch shows an increase in sphericity compared to the particle average before the acid etch of between about 1% and about 10%, between about 1% and about 8%, between about 1% and about 6%, between about 1% and about 4%, between about 1% and about 2%, between about 2% and about 10%, between about 2% and about 8%, between about 2% and about 6%, between about 2% and about 4%, between about 4% and about 10%, between about 4% and about 8%, between about 4% and about 6%, between about 6% and about 10%, between about 6% and about 8%, or between about 8% and about 10%.

In some embodiments, the particle average after annealing shows an increase in sphericity compared to the particle average before annealing of between about 1% and about 10%, between about 1% and about 8%, between about 1% and about 6%, between about 1% and about 4%, between about 1% and about 2%, between about 2% and about 10%, between about 2% and about 8%, between about 2% and about 6%, between about 2% and about 4%, between about 4% and about 10%, between about 4% and about 8%, between about 4% and about 6%, between about 6% and about 10%, between about 6% and about 8%, or between about 8% and about 10%.

Having now generally described this invention, the same will be understood by reference to the following examples which are provided herein for purposes of illustration only and are not intended to be limiting unless otherwise specified.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

The following sets forth a series of examples that demonstrate growth of highly luminescent nanostructures.

Example 1

The deposition of a thick ZnSe/ZnS multi-layered shell on a green InP core using zinc oleate, tributylphosphine selenide, and octanethiol as precursors at temperatures exceeding 280° C. is described.

Zinc oleate was prepared from zinc acetate and oleic acid as a solid. Tri(n-butyl)phosphine selenide (TBPSe) was prepared from selenium pellets and tri(n-butyl)phosphine. The InP core solution was prepared by filtering an aliquot (e.g., 15 mL of the core) through a 5 μm polytetrafluoroethylene (PTFE) syringe filter to remove the precipitate from the core solution.

To a 250 mL 3 neck round-bottom flask was added 3.48 g (5.54 mmol, 13.38 equivalents) of zinc oleate and 33.54 mL of 1-octadecene at room temperature in air. The flask was equipped with a stir bar, a rubber septum, a Schlenk adaptor, and a thermocouple. The flask was connected to a Schlenk line via a rubber hose. Inert conditions were established by at least three cycles of vacuum (<50 mtorr) and nitrogen flushing. The mixture was heated to 80° C. under nitrogen flow to afford a clear solution. Zinc oleate stuck to the flask wall and was melted with a heat gun and allowed to flow back in the solution. The temperature was maintained and the flask was put under vacuum once again and pumped until no further gas evolution (<50 mtorr) was observed. The heating mantle was removed and the flask was allowed to cool under nitrogen flow.

When the temperature was approximately 50° C., 0.060 g (0.41 mmol, 1.00 equivalents) of InP (diameter of the core=17.79 Angstrom) in 0.91 mL of hexane was added. The flask was placed under vacuum cautiously to avoid pulling solution into the rubber hose. The mixture was pumped down to <50 mtorr to remove hexane and material splattered on the flask wall was brought back into the solution by heating with a heat gun. Subsequently, the reaction mixture was heated to 80° C. under nitrogen flow which afforded, a clear solution. 2.52 mL (5.04 mmol, 12.16 equivalents) of TBPSe was added at approximately 100° C. The temperature was set to 280° C. and the timer was started. A reaction temperature of 280° C. was reached after approximately 16 minutes and then held until the timer count was at 40 minutes (roughly 10 minutes per mL of TBPSe). The heating mantle was removed and the flask was allowed to cool naturally.

When the temperature was below 100° C., the nitrogen flow was increased to 15 standard cubic feet per hour, the septum was removed, and 16.57 g (26.38 mmol, 63.72 equivalents) of zinc oleate and 0.45 g (2.25 mmol, 5.48 equivalents) of lauric acid were added through a powder funnel. After reinserting the septum, the flask was put under vacuum carefully until no further gas evolution (<50 mtorr) was observed. The reaction mixture was heated to 280° C. under nitrogen flow for buffer layer etching and held for 15 minutes (including ramp time, timing started when the heater was started). Subsequently, the reaction flask was allowed to cool naturally. 4.16 mL (23.98 mmol, 57.93 equivalents) of octanethiol was added via a syringe at approximately 130-150° C. The temperature was set to 300° C. and the timer was started again. The reaction temperature was reached after approximately 14 minutes and held until 50 min (~10 min/mL). The heating mantle was removed and the flask was allowed to cool naturally.

After the temperature of the reaction mixture was below 100° C., the thermocouple was replaced with a glass stopper under nitrogen flow. The flask was carefully set under a slight vacuum and brought into a glove box along with two PTFE bottles. The mixture was poured into one PTFE bottle, and the flask was rinsed two times with 4 mL hexane and the rinse solutions were added to the PTFE bottle. After the mixture in the bottle cooled to room temperature, it was centrifuged at 4000 rpm for 5 minutes to separate the insoluble material. The clear but colorful supernatant was decanted into the second PTFE bottle, and 16 mL hexane was added to the first PTFE bottle to extract more quantum dot material from the insoluble side products. The first bottle was shaken and vortexed to ensure sufficient mixing, and then subjected to centrifugation at 4000 rpm for 5 minutes. The supernatant was combined with the first supernatant in the second PTFE bottle, and the now lighter insoluble wax in the first bottle was discarded. The combined supernatants were precipitated with ethanol (2× volume, approximately 120 mL), and centrifuged at 4000 rpm for 5 minutes. The now almost colorless supernatant was discarded, and the centrifugate was redispersed in a total of 4 mL toluene (initially 2 mL, then rinsed the bottle twice with 1 mL).

During the reaction, aliquots of approximately 50 μL were taken roughly every 15 minutes for spectroscopic analysis. These aliquots were immediately quenched in 1 mL hexane, and then further diluted by adding approximately 100 μL of the sample to 4 mL hexane in a cuvette. This cuvette was subjected to absorption, fluorescence, and fluorescence excitation (at the peak emission wavelength) spectroscopy. The optical density (OD) at 330 nm should be below 0.1 to avoid the inner filter effect, in the excitation spectra.

At the end of each step (ZnSe shell and ZnS shell) aliquots of approximately 200 μL were taken for eventual TEM analysis. These were not quenched and subsequently washed three times with a 1:3 solution of hexane:ethanol in the glove box. A hexane solution with $OD_{460}$=0.4 was submitted to for TEM analysis.

For quantum yield (QY) measurement, an aliquot of 0.5 mL was taken from the combined supernatants during work-up (or after the last reaction step during cool down) and submitted for quantum yield analysis.

Example 2

Figure 3:
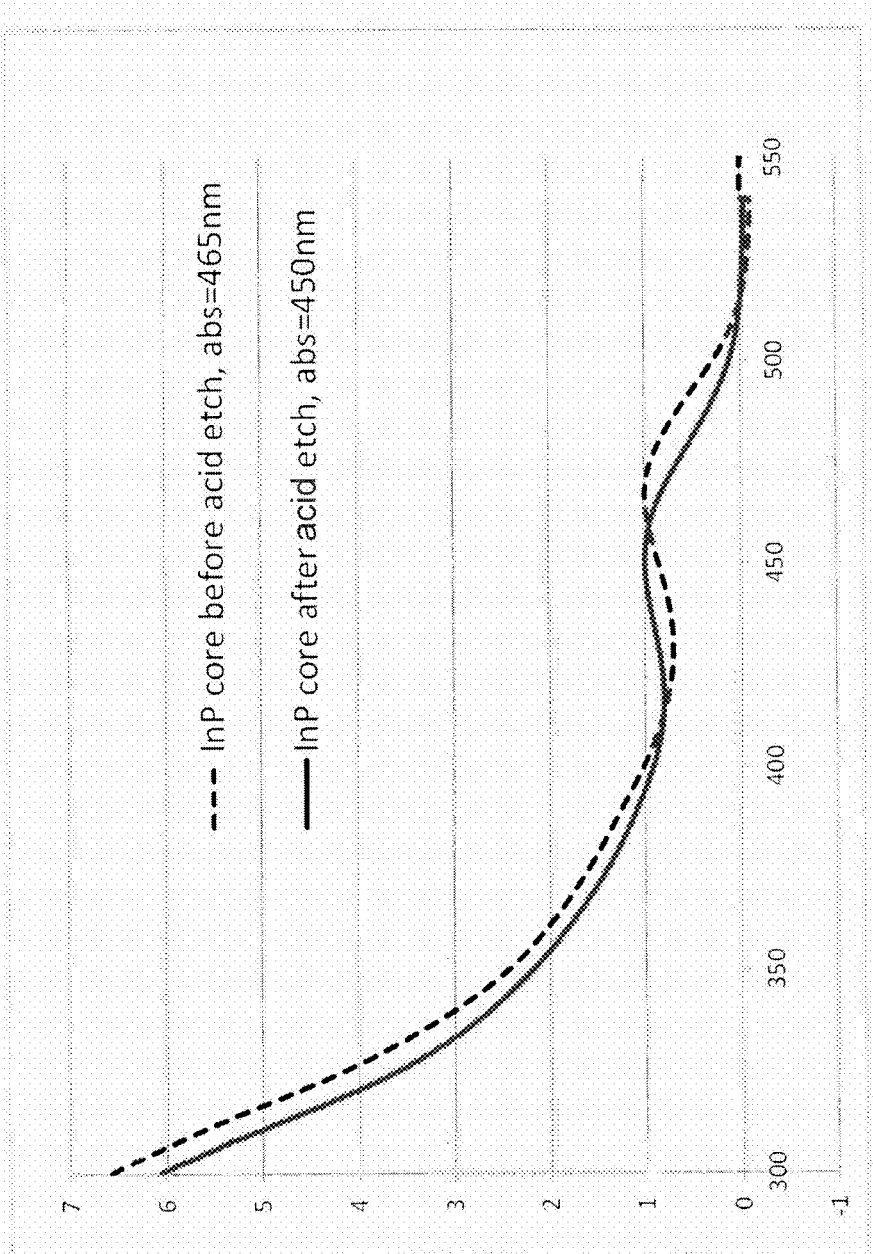
FIG. 3 is a UV-Vis spectra of a green InP core before an acid etch step (dotted line) and after an acid etch step (solid line).

In situ InP Core Synthesis and Acid Etch 5 g (0.0129 mol) of trioctylphosphine oxide, 1.45 g (0.004967 mol) of indium acetate, 3 g (0.0498 mol) of lauric acid, and 50 mg (0.0272 mmol) of zinc acetate were added to a reaction flask. The mixture was heated to 120° C. for 40 minutes under vacuum, then the reaction temperature was increased to 300° C. under a flow of nitrogen. At this temperature, 1 g of tris(trimethylsilyl)phosphine in 4 g of trioctylphosphine was quickly injected into the reaction flask, and the reaction temperature was kept at 260° C. After one minute, the reaction was stopped by removal of heat. The reaction mixture was cooled to 80° C. and 1.2 g (0.00599 mol) of lauric acid was added to the reaction flask. The temperature of the reaction mixture was kept at 80° C. for 40 minutes. As shown in FIG. 3 the InP core was etched during this period with a 15 nm blue shift of the first exciton absorption peak. The reaction mixture was removed from the heat. Once the reaction mixture cooled to room temperature, 20 mL of toluene was added to the reaction mixture in the glove box, and InP dots were precipitated out by adding 50 mL of ethanol to the mixture followed by centrifugation and decanting. The obtained InP dots were dissolved in hexane. The concentration of the InP quantum dots was determined by UV-Vis absorption measurement based on the InP bulk extinction coefficient at 350 nm.

Example 3

In Situ InP Acid Etch and Shell Growth to Form Green Emitting InP/ZnSe/ZnS Dots 30 mL of 1-octadecene, 1.2 g (0.00599 mol) of lauric acid, and 50 mg (0.000343 mol) of an InP core in a hexane solution wet e added to a reaction flask. The reaction temperature was heated to 100° C. for 10 minutes. The InP core was etched during this period.

A ZnSe buffer layer was formed by introducing 2.6 g of zinc stearate and 1 mL of 2 M selenium in tributylphosphine. The temperature of the reaction mixture was increased to 280° C. and held for 60 minutes at that temperature.

A ZnS shell was formed by adding 12.3 g of zinc stearate and 3.4 mL 1-octanethiol. The temperature of the reaction mixture was increased to 300° C. and held for 50 minutes at that temperature. The reaction mixture was cooled to room temperature and further purified and characterized.

As shown in Table 1, introducing the core etch process resulted in an increase in the quantum yield of green emitting dots by ~15% (entry number 1 versus entry number 2) and resulted in an increase in the quantum yield of red emitting dots by ~30% (entry 3 versus entry 4). And, the TEM image of the acid etched core has a more spherical core/shell morphology.

TABLE 1

Optical properties of InP/ZnSe/ZnS from unetched and etched cores

| | InP core synthetic conditions | core/shell structure | quantum yield (%) | Emission wavelength (nm) | FWHM (nm) |
|---|---|---|---|---|---|
| 1 | no acid etch | InP/ZnSe/ZnS | 60.3 | 541.6 | 40.2 |
| 2 | acid etch | InP/ZnSe/ZnS | 76.1 | 531.3 | 43.4 |
| 3 | no acid etch | InP/ZnSe/ZnS | 48.1 | 633.8 | 49.4 |
| 4 | acid etch | InP/ZnSe/ZnS | 78.8 | 633.9 | 46.1 |

Example 4

Process for Green Annealed Core/Shells

Lauric acid, trioctylphosphine oxide, 1-octadecene, and oleylamine were added to a reaction flask. The reaction mixture was heated to 100° C. with degassing (3 purge followed by vacuum cycles) of the reaction flask. The reaction mixture was held at 100° C. under vacuum for 15 minutes. The cores were injected into the reaction mixture. The reaction mixture was heated to 210° C. followed by cooling the reaction mixture to 140° C. The reaction mixture was then allowed to increase over a 10 minute period to a temperature of 150° C.

A Zn/S or a Cd stock solution was prepared. If Cd was added to the reaction mixture it was added over 38 minutes. If Zn/S was added to the reaction mixture it was added over 90 minutes. The temperature was held for 10 minutes followed by cooling to room temperature.

Example 5

Process for Red Annealed Core/Shells

Lauric acid, trioctylphosphine oxide, 1-octadecene, and oleylamine were added to a reaction flask. The reaction mixture was heated to 100° C. with degassing (3 purge followed by vacuum cycles) of the reaction flask. The reaction mixture was held at 100° C. under vacuum for 15 minutes. The cores were injected into the reaction mixture. The reaction mixture was heated to 270° C. followed by cooling the reaction mixture to 140° C. The reaction mixture was then allowed to increase over a 10 minutes period to a temperature of 150° C.

A Zn/S or a Cd stock solution was prepared. If Cd was added to the reaction mixture it was added over 70 minutes at 150° C. If Zn/S was added to the reaction mixture it was added over 60 minutes at 150° C. The temperature was increased over a 90 minute period to between 150-220° C. The temperature was held for 10 minutes followed by cooling to room temperature.

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

What is claimed is:

1. A population of nanostructures comprising a core comprising InP and at least one shell wherein the population of nanostructures deviate from a perfect sphere shape by between about 1% and about 8% and have a full width at half-maximum (FWHM) of between 10 nm and 60 nm.

2. The population of nanostructures of claim 1, wherein the population of nanostructures displays a photoluminescence quantum yield between 70% and 99%.

3. The population of nanostructures of claim 1, wherein the at least one shell comprises at least one of zinc, sulfur, selenium, or tellurium.

4. The population of nanostructures of claim 1, wherein the population of nanostructures has a FWHM of between 10 nm and 50 nm.

5. The population of nanostructures of claim 1, wherein the population of nanostructures deviate from a perfect sphere shape by between about 1% and about 4%.

6. The population of nanostructures of claim 1, wherein the population of nanostructures displays a photoluminescence quantum yield between 75% and 99%.

7. The population of nanostructures of claim 1, wherein the at least one shell comprises zinc and selenium or zinc and sulfur.

8. The population of nanostructures of claim 1, wherein the population of nanostructures comprises two shells, wherein a first shell comprises zinc and selenium and a second shell comprises zinc and sulfur.

9. A method of producing the population of nanostructures of claim 1 comprising:
(a) contacting a nanocrystal core comprising InP with an organic acid, wherein the molar ratio of the nanocrystal core to the organic acid is between about 1:1 and about 1:1000; and
(b) heating (a) at a temperature between about 50° C. and about 250° C. to provide a nanostructure.

10. The method of claim 9, wherein the organic acid is a carboxylic acid, a phosphonic acid, or a sulfonic acid.

11. The method of claim 9, wherein the organic acid is selected from the group consisting of lauric acid, hexanoic acid, oleic acid, trifluoromethanesulfonic acid, octyl phosphonic acid, 2-ethylhexanoic acid, myristic acid, decanoic acid, palmitic acid, stearic acid, linoleic acid, and mixtures thereof.

12. The method of claim 9, wherein the nanostructure produced is substantially spherical.

13. The method of claim 9, wherein the nanostructure produced in (b) shows an increase in sphericity compared to the starting nanocrystal core in (a) of between about 1% and about 10%.

14. The method of claim 9, further comprising:
(c) heating the nanostructure of (b) at a temperature between about 200° C. and 350° C. for between about 1 minute and 2 hours.

15. The method of claim 14, further comprising:
(d) contacting the nanostructure of (c) with a shell material; and
(e) heating (d) at a temperature between about 200° C. and about 310° C.;
to provide a nanostructure with at least one shell.

16. The method of claim 9, further comprising:
(d) contacting the nanostructure of (b) with a shell material; and
(e) heating (d) at a temperature between about 200° C. and about 310° C.;
to provide a nanostructure with at least one shell.

17. The method of claim 15, wherein the shell material comprises at least two of a zinc source, a sulfur source, a selenium source, and a tellurium source.

18. The method of claim 9, wherein the organic acid is lauric acid, the heating in (b) is conducted for between about 10 minutes and 50 minutes, and the heating in (b) is at a temperature between about 50° C. and about 100° C.

19. A method of producing the population of nanostructures of claim 1 comprising:
(a) heating a nanocrystal core comprising InP at a temperature between about 150° C. and 350° C. for between about 1 minute and 2 hours to provide a nanostructure;
(b) contacting the nanostructure of (a) with a shell material; and
(c) heating (b) at a temperature between about 200° C. and about 310° C.;
to provide a nanostructure with at least one shell.

20. The method of claim 19, wherein the nanostructure produced in (c) is substantially spherical.

21. The method of claim 19, wherein the nanostructure produced in (c) shows an increase in sphericity compared to the starting nanocrystal core in (a) of between about 1% and about 10%.

22. The method of claim 19, wherein the shell material of (b) comprises at least two of a zinc source, a sulfur source, a selenium source, and a tellurium source.

* * * * *